(12) United States Patent
Vasseur et al.

(10) Patent No.: US 9,641,542 B2
(45) Date of Patent: May 2, 2017

(54) DYNAMIC TUNING OF ATTACK DETECTOR PERFORMANCE

(71) Applicant: Cisco Technology, Inc., San Jose, CA (US)

(72) Inventors: Jean-Philippe Vasseur, Saint Martin d'Uriage (FR); Andrea Di Pietro, Lausanne (CH); Javier Cruz Mota, Assens (CH)

(73) Assignee: Cisco Technology, Inc., San Jose, CA (US)

( * ) Notice: Subject to any disclaimer, the term of this patent is extended or adjusted under 35 U.S.C. 154(b) by 17 days.

(21) Appl. No.: 14/336,206

(22) Filed: Jul. 21, 2014

(65) Prior Publication Data
US 2016/0021126 A1    Jan. 21, 2016

(51) Int. Cl.
| G06F 21/56 | (2013.01) |
| H04L 29/06 | (2006.01) |
| G06F 21/12 | (2013.01) |

(52) U.S. Cl.
CPC ...... *H04L 63/1416* (2013.01); *H04L 63/1458* (2013.01)

(58) Field of Classification Search
CPC .................................................. H04L 41/5003
See application file for complete search history.

(56) References Cited

U.S. PATENT DOCUMENTS

| 6,954,775 | B1 * | 10/2005 | Shanklin ............. H04L 63/1416 713/168 |
| 7,107,464 | B2 * | 9/2006 | Shapira ............... H04L 63/0485 709/200 |
| 7,873,583 | B2 | 1/2011 | Laxman et al. |
| 8,065,722 | B2 | 11/2011 | Barford et al. |
| 8,103,727 | B2 | 1/2012 | Lin |
| 8,243,742 | B2 * | 8/2012 | Forsberg ............. H04L 12/5695 370/328 |
| 8,504,504 | B2 | 8/2013 | Liu |
| 8,682,812 | B1 | 3/2014 | Ranjan |
| 8,732,833 | B2 * | 5/2014 | Choi ................... H04L 63/1416 380/243 |
| 8,909,711 | B1 * | 12/2014 | Staddon ................ G06Q 50/01 709/204 |
| 2005/0286772 | A1 | 12/2005 | Albertelli |
| 2007/0094728 | A1 | 4/2007 | Julisch et al. |

(Continued)

OTHER PUBLICATIONS

Distribute Cloud Intrusion Detection Model. Hussain. IJAST(2011).*

(Continued)

*Primary Examiner* — Venkat Perungavoor
(74) *Attorney, Agent, or Firm* — Parker Ibrahim & Berg LLC; James M. Behmke; Kenneth J. Heywood

(57) ABSTRACT

In one embodiment, a device in a network receives information regarding one or more attack detection service level agreements. The device identifies a set of attack detection classifiers as potential voters in a voting mechanism used to detect a network attack. The device determines one or more parameters for the voting mechanism based on the information regarding the one or more attack detection service level agreements. The device adjusts the voting mechanism used by the potential voters based on the one or more parameters for the voting mechanism.

19 Claims, 22 Drawing Sheets

(56) References Cited

U.S. PATENT DOCUMENTS

| | | | |
|---|---|---|---|
| 2008/0083029 A1 | 4/2008 | Yeh et al. | |
| 2009/0225763 A1* | 9/2009 | Forsberg | H04L 12/5695 370/401 |
| 2013/0160122 A1* | 6/2013 | Choi | H04L 63/1458 726/23 |
| 2014/0223562 A1* | 8/2014 | Liu | H04L 63/1458 726/23 |
| 2014/0283051 A1* | 9/2014 | Doron | H04L 63/1458 726/23 |

OTHER PUBLICATIONS

Deteting Service Violations and DoS Attacks. Habib et al.2003.*
An intrusion detection and prevention system in cloud computing: A systematic review. Patel et al. JNCA(2013).*

* cited by examiner

DYNAMIC TUNING OF ATTACK DETECTOR PERFORMANCE

TECHNICAL FIELD

The present disclosure relates generally to computer networks, and, more particularly, to dynamically tuning the performance of an attack detector in a network.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

One type of network attack that is of particular concern in the context of LLNs is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. The detection of DoS attacks is particularly challenging in the context of LLNs, where the network is typically more susceptible to external conditions, under greater resource constraints, and more dynamic than a traditional network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
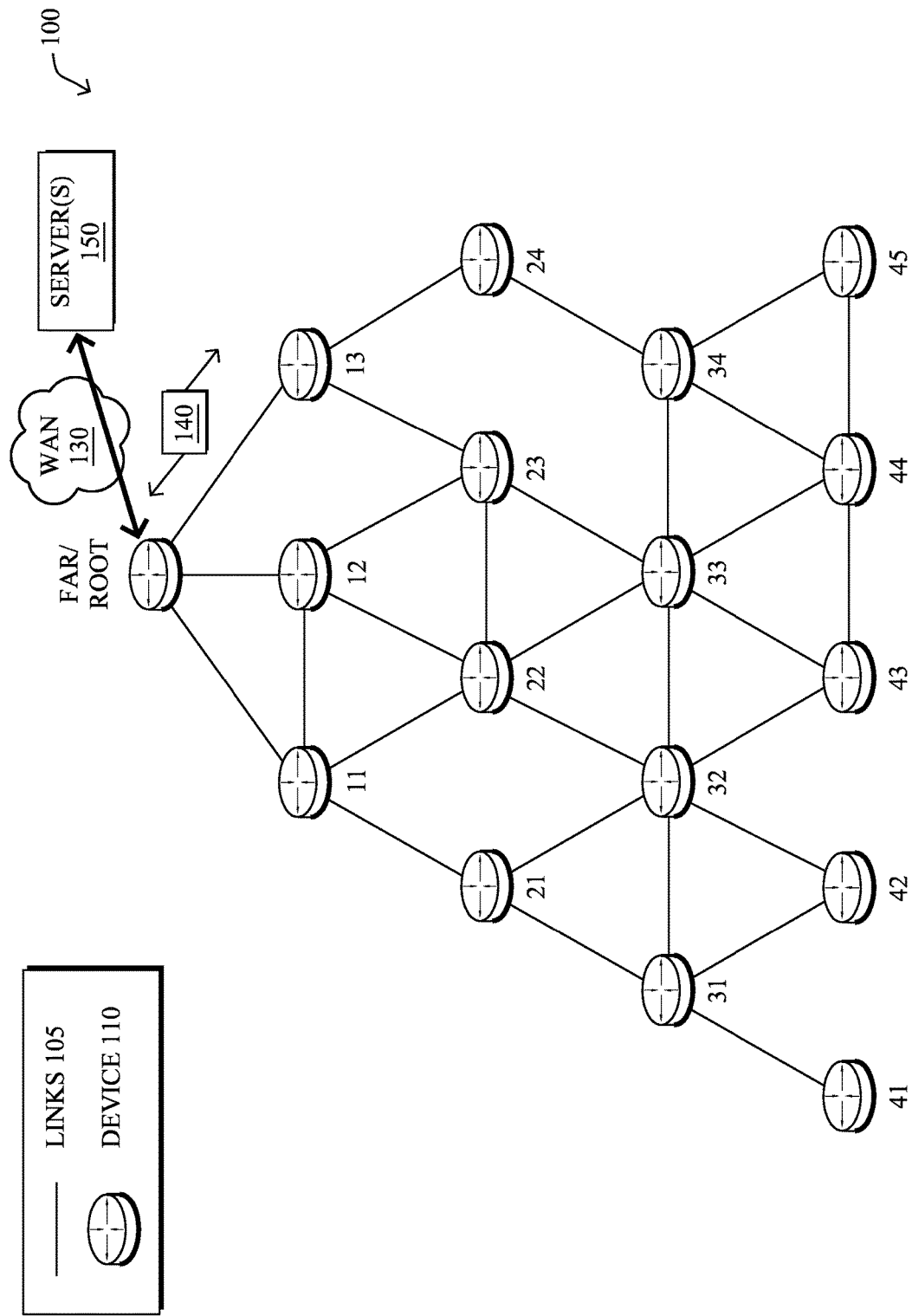
FIG. 1 illustrates an example communication network.

According to one or more embodiments of the disclosure, a device in a network receives information regarding one or more attack detection service level agreements. The device identifies a set of attack detection classifiers as potential voters in a voting mechanism used to detect a network attack. The device determines one or more parameters for the voting mechanism based on the information regarding the one or more attack detection service level agreements. The device adjusts the voting mechanism used by the potential voters based on the one or more parameters for the voting mechanism.

In further embodiments, a device in a network receives one or more attack detection service level agreements. The device identifies a node in the network that uses an attack detection mechanism to detect a network attack. The device determines a set of attack detection parameters for the attack detection mechanism based on the one or more attack detection service level agreements. The device adjusts the attack detection mechanism of the node based on the set of attack detection parameters. The set of attack detection parameters include one or more of: a sampling period in which the node is to collect information regarding the network, a number of samples to be collected by the node during the sampling period, or a threshold number of samples from the sampling period that must be labeled by the node as indicative of an attack for the node to determine an attack has been detected.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
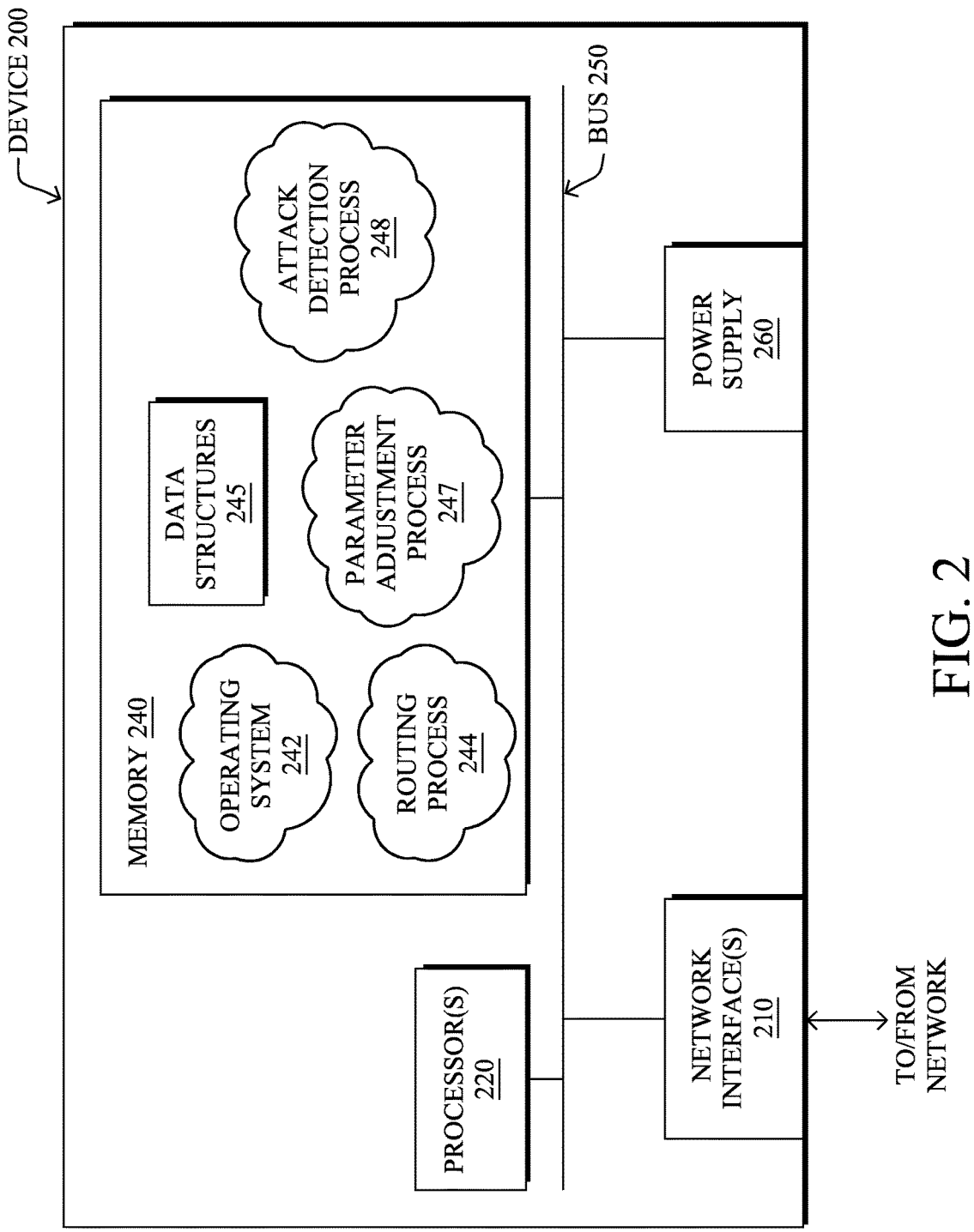
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244, a parameter adjustment process 247, or an attack detection process 248, which may be configured depending upon the particular node/device within the network 100 with functionality ranging from intelligent learning machine processes to merely communicating with intelligent learning machines, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Attack detection process 248 includes computer executable instructions executed by the processor 220 to perform various functions, such as attack detection and reporting. In various embodiments, attack detection process 248 may use machine learning to detect a potential network attack. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes such that M=a*x+b*y+c and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data. Accordingly, attack detection process 248 may be an attack detection classifier that classifies network traffic or conditions into either an "attack" category or a "normal operation" category, based on learned behavior of the network.

As also noted above, learning machines (LMs) are computational entities that rely on one or more machine learning processes for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Artificial Neural Networks (ANNs) are a type of machine learning technique whose underlying mathematical models that were developed inspired by the hypothesis that mental activity consists primarily of electrochemical activity between interconnected neurons. ANNs are sets of computational units (neurons) connected by directed weighted links. By combining the operations performed by neurons and the weights applied by the links, ANNs are able to perform highly non-linear operations to input data. The interesting aspect of ANNs, though, is not that they can produce highly non-linear outputs of the input, but that they can learn to reproduce a predefined behavior through a training process. Accordingly, an ANN may be trained to identify deviations in the behavior of a network that could indicate the presence of a network attack (e.g., a change in packet losses, link delays, number of requests, etc.). In some cases, ANN classifiers may be hierarchical in that a more powerful classifier verifies a conclusion reached by a lower-powered classifier. Other machine learning techniques that may be used in an attack detection classifier may include, but are not limited to, support vector machines (SVMs), naïve Bayesian models, decision trees, and the like.

Attack detection process 248 may also employ anomaly detection techniques, to classify network conditions as being indicative of an attack. Anomaly Detection (AD) is a data mining and machine learning technique that entails detecting, from a flow of data, the elements of the flow that do not follow the same pattern as the other flow elements. In particular, AD techniques may be used to construct a model of normal behavior and may use the model to detect data points that are unlikely to fit the model. Example AD techniques include, but are not limited to, k-NN techniques, one-class SVM techniques, replicator NN techniques, etc. Notably, such techniques may be used by attack detection process 248 to detect previously unseen forms of attacks.

In further embodiments, attack detection process 248 may use clustering techniques, to detect a potential network attack. Clustering denotes a family of techniques in which the objective is to group objects according to some (usually predefined) notion of similarity. For instance, clustering is a very popular technique used in recommender systems (RS) for grouping objects that are similar in terms of people's tastes. This way, the system can propose new products that the user will like with a high probability, based on previous choices of this particular user. Typical clustering algorithms are k-means, DBSCAN or Mean-Shift, among others.

Parameter adjustment process 247 includes computer executable instructions executed by the processor 220 to perform the functions described herein with respect to adjusting the operation of an attack detection classifier (e.g., attack detection process 248). For example, and as discussed below, parameter adjustment process 247 may be operable to adjust the performance of an attack classifier and/or voting mechanism among classifiers, to satisfy an attack detection SLA.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are included in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by a DAG process) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks"<RFC 6551> by Vasseur, et al. (March 2012 version). Further, an example OF (e.g., a default OF) may be found in an IETF RFC, entitled "RPL Objective Function 0"<RFC 6552> by Thubert (March 2012 version) and "The Minimum Rank Objective Function with Hysteresis" <RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
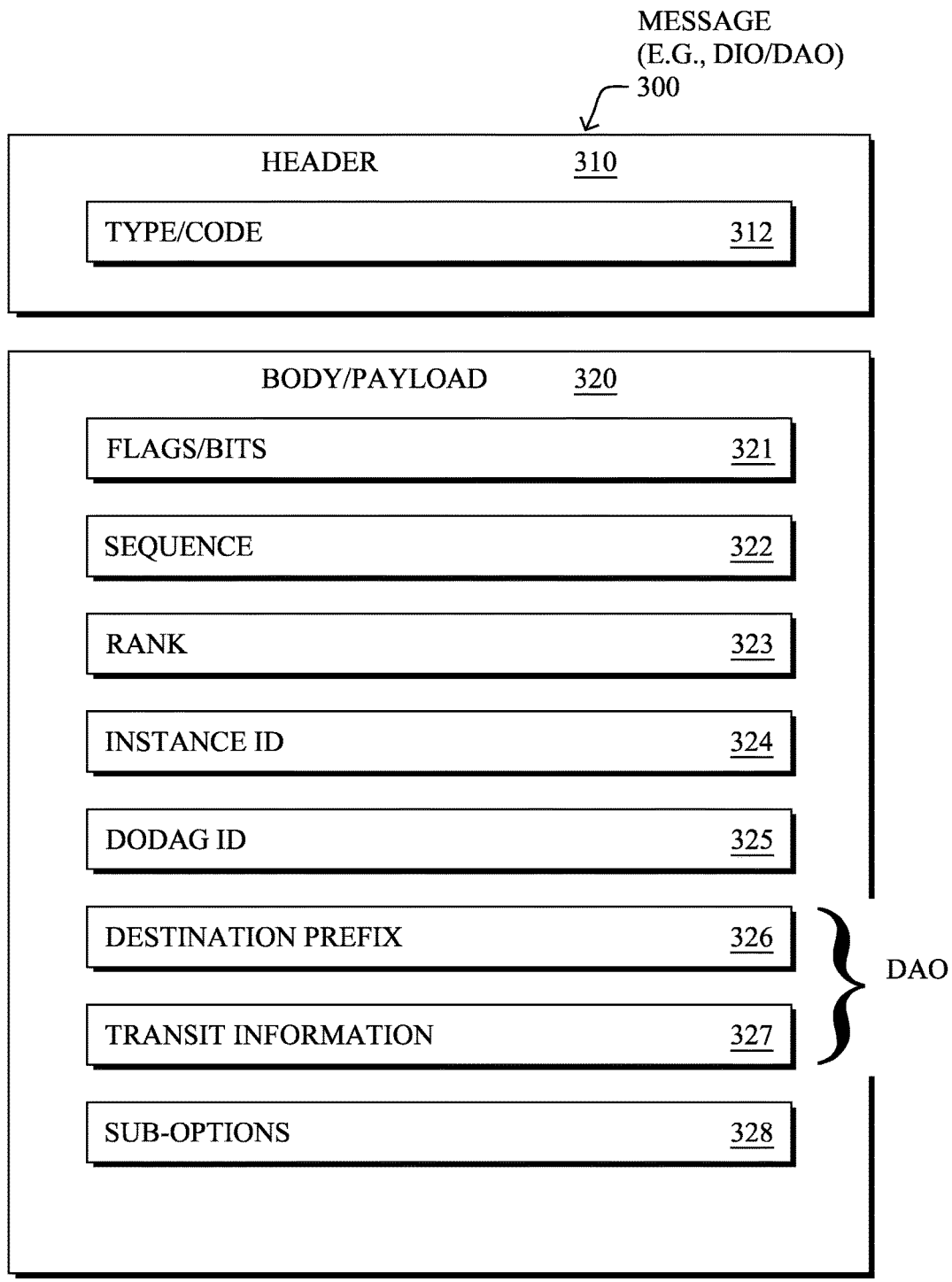
FIG. 3 illustrates an example message.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
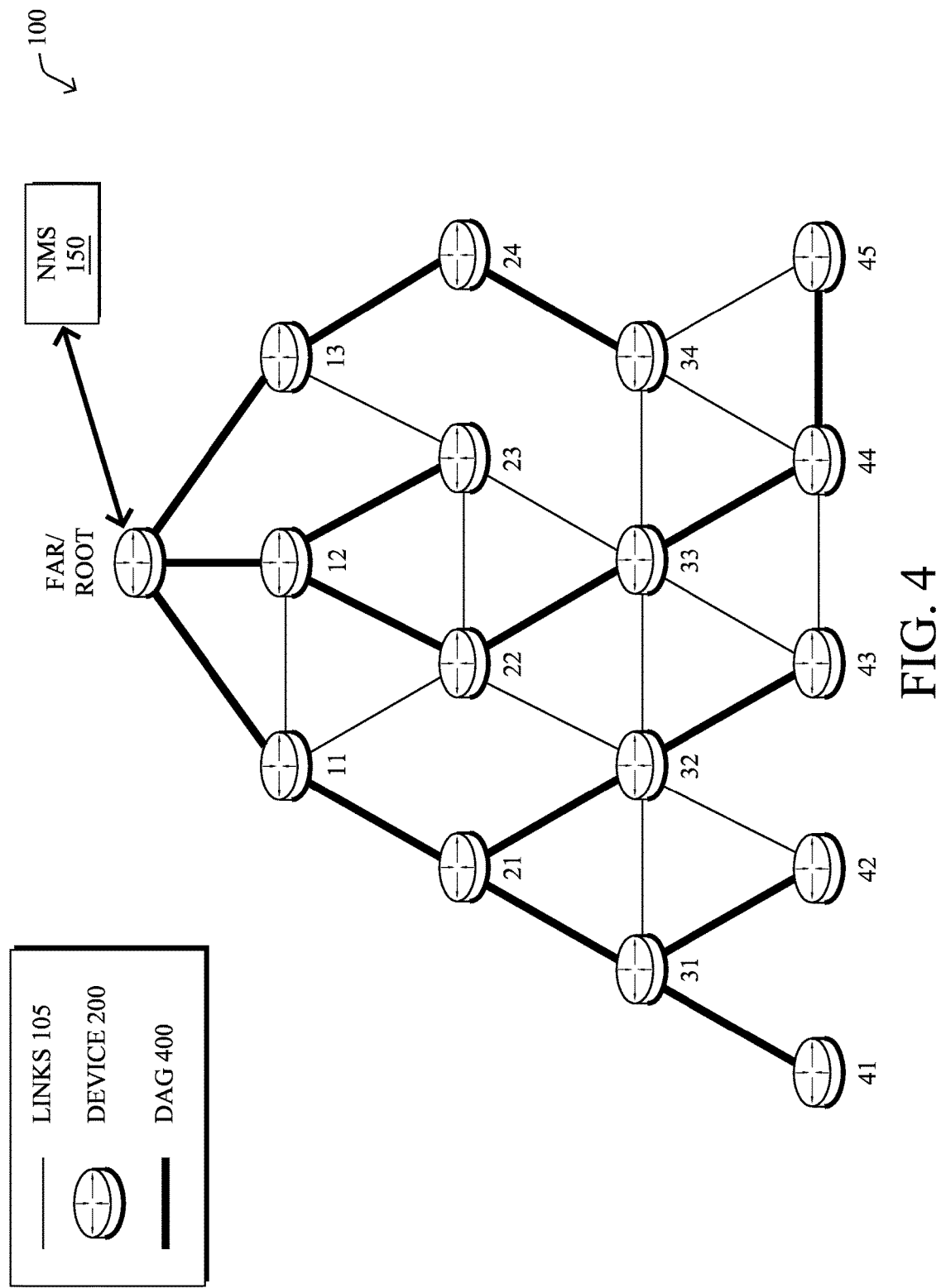
FIG. 4 illustrates an example directed acyclic graph (DAG) in the communication network of FIG. 1.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

Figure 5A:
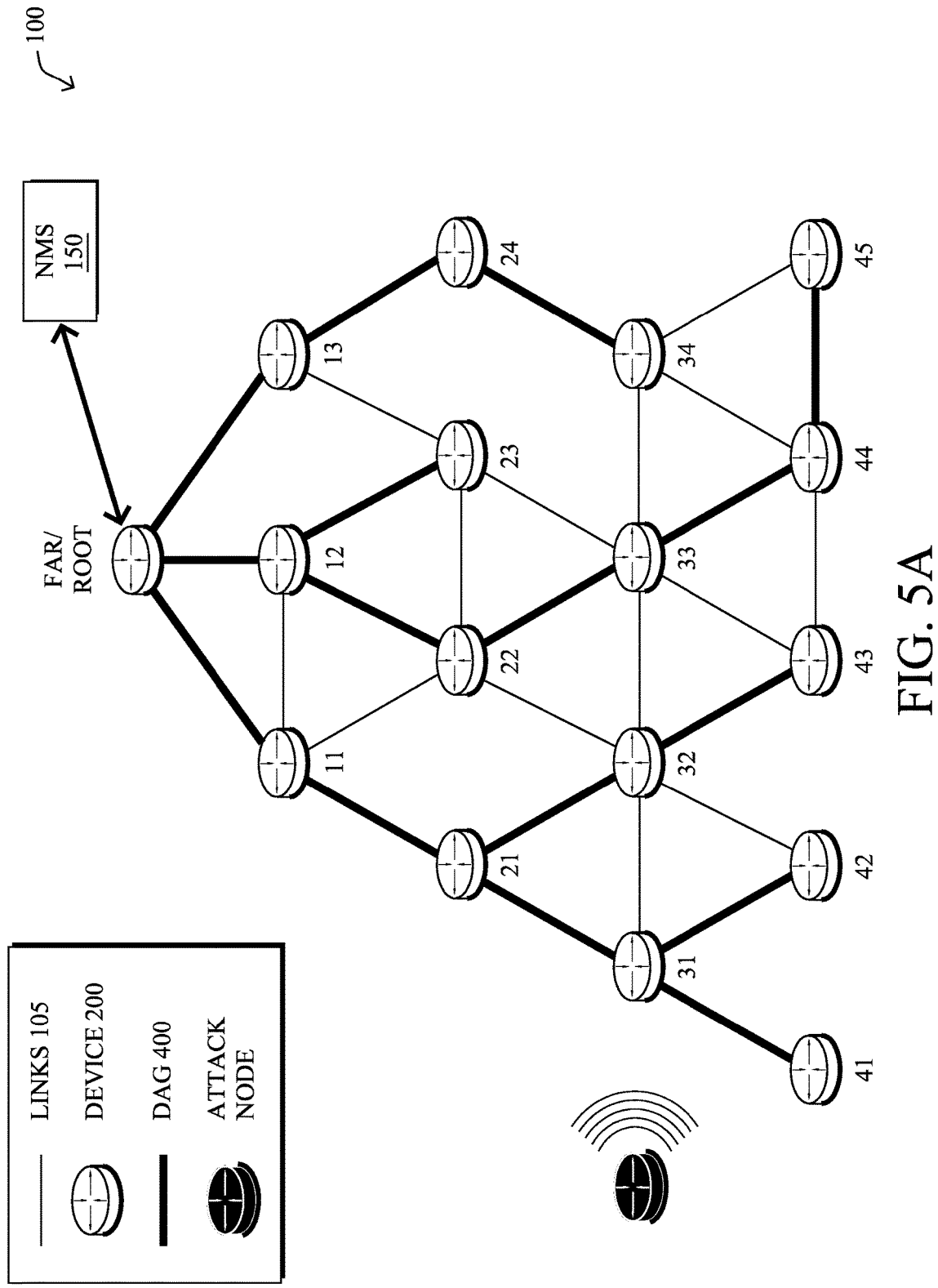
FIGS. 5A-5B illustrate an example of the detection and reporting of a potential network attack.
Figure 5B:
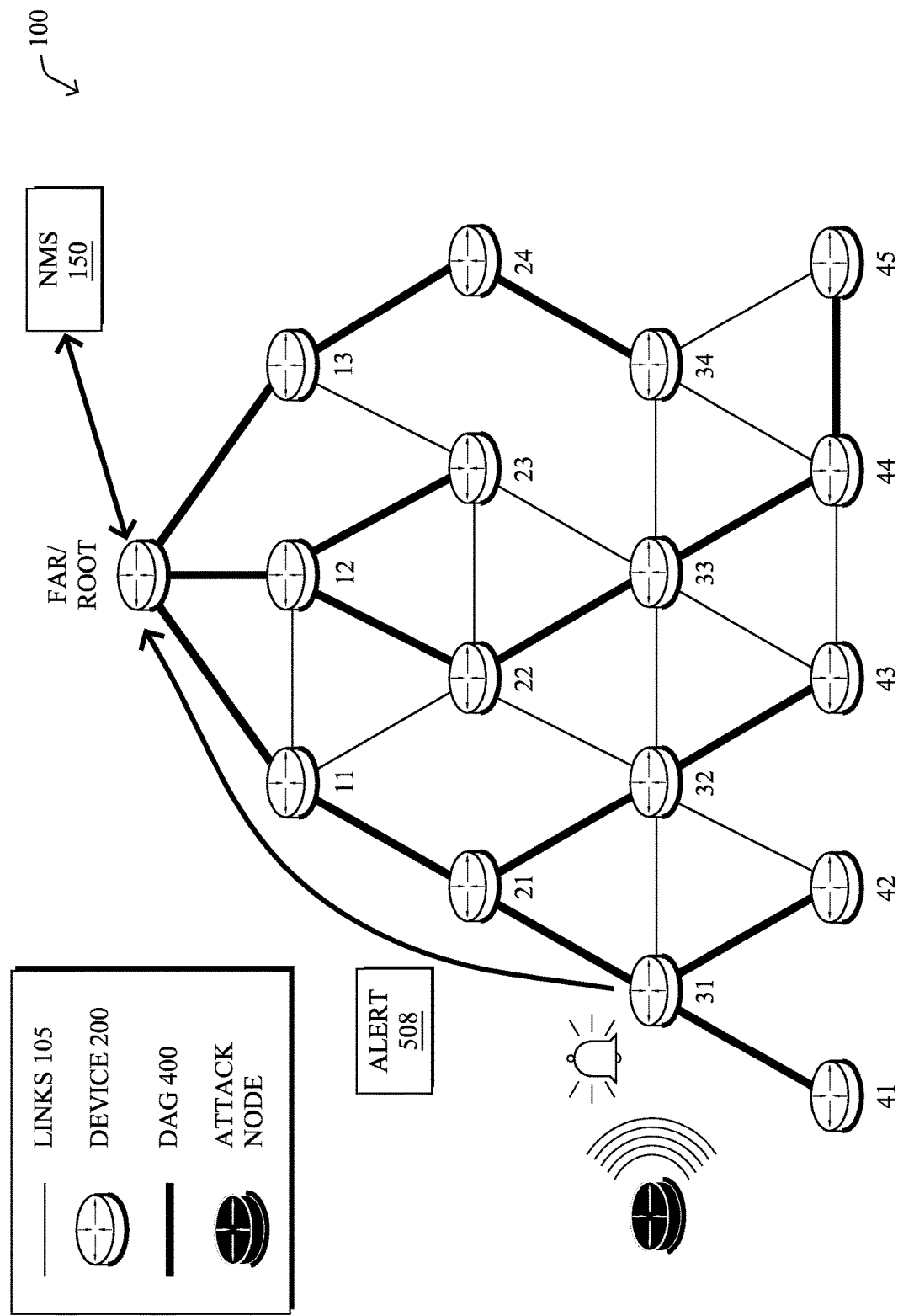

Referring now to FIGS. 5A-5B, an example is illustrated of a network attack being detected and reported within network 100. Any or all of the nodes/devices 200 shown may execute a learning machine process (e.g., attack detection process 248) that is configured to detect potential network attacks, such as a DoS attack, using a machine learning classifier. Assume for illustrative purposes that an attack node/device launches an attack targeted at node 41, as shown in FIG. 5A. As a result of the attack, the performance of the communication link between nodes 41 and 31 may change (e.g., by affecting the amount of packet loss along the link, by increasing number of requests originating from node 41, by increasing delays, etc.). In such a case, the learning machine process executed by node 31 may analyze the changes and determine that a potential attack has been detected, as shown in FIG. 5B. In response, node 31 may generate and send an alert 508 to a supervisory device such as the network FAR/Root, NMS, or other such device via which corrective measures may be taken (e.g., by alerting a human operator of the potential attack, instituting routing changes, etc.). As will be appreciated, alerts and other corrective measures may also be initiated by any other node in addition to that of node 31, such as node 42, other neighbors of node 42, etc.

One of the major challenges when using machine learning classifiers for purposes of attack detection is the tension between recall and false positives. In general, recall may be computed as the ratio of true positives (TP) divided by the sum of true positives (TP) and false negatives (FN). In other words, recall characterizes the sensitivity of the classifier. Precision is another performance metric that may also be used to characterize a machine learning classifier. Precision is generally defined as the ratio of true positives to the ratio of true positives and the sum of true and false positives. The false positives themselves may also be used as performance metrics, in some cases.

Notably, performance metrics (e.g., recall, precision, false positives, etc.) for a machine learning classifier, and more particularly to an attack detection mechanism that uses such classifiers, are often inter-related such that adjustment of one parameter also affects the other parameters. For example, optimizing the recall of a classifier may unavoidably increase the number of false positives and also affecting the precision of the classifier. Thus, balancing performance metrics may be challenging since an ideal system rarely exists (e.g., with a recall of 100% and a false positive rate of 0%). In some cases, a network administrator may wish to achieve the highest possible recall at the price of increasing the false positive rate, and thereby increasing bandwidth usage during reporting. In other cases, a lower recall may be acceptable so long as the false positive rate is improved (e.g., certain types of attacks may not be as critical as others).

Dynamic Tuning of Attack Detector Performance

The techniques herein provide a control loop to adjust the performance of an attack detection mechanism, to meet a specified attack detection SLA and potentially on a per attack basis. In some aspects, a process hosted on a network controller or other supervisory device may gather the performance requirements (e.g., recall, false positive, precision, etc.) specified by a network administrator or NMS. A parameter adjustment process (e.g., process 247) may dynamically adjust the parameters of the attack detection mechanism (e.g., the voting rules used among classifiers, how temporal filtering is used, etc.), to obtain the specified performance metrics for the attack detection mechanism and potentially on a per-attack type basis.

Specifically, according to one or more embodiments of the disclosure as described in detail below, a device in a network receives information regarding one or more attack detection service level agreements. The device identifies a set of attack detection classifiers as potential voters in a voting mechanism used to detect a network attack. The device determines one or more parameters for the voting mechanism based on the information regarding the one or more attack detection service level agreements. The device adjusts the voting mechanism used by the potential voters based on the one or more parameters for the voting mechanism.

Illustratively, the techniques described herein may be performed by hardware, software, and/or firmware, such as in accordance with the attack detection process 248, which may include computer executable instructions executed by the processor 220 to perform functions relating to the techniques described herein, e.g., in conjunction with parameter adjustment process 247. For example, the techniques herein may be treated as extensions to conventional protocols, and as such, may be processed by similar components understood in the art that execute those protocols, accordingly.

Operationally, various parameters of an attack detection mechanism may be adjusted to satisfy one or more attack detection SLAs (e.g., a specified recall, etc.). In some embodiments, an attack detection mechanism may make use of voting among classifiers, to detect a potential network attack. In such cases, the voting process may be adjusted, to satisfy the attack detection SLA. In further embodiments, temporal voting may be employed such that an attack is detected if a certain number of attack labels are applied by a classifier within a given time period.

Figure 6A:
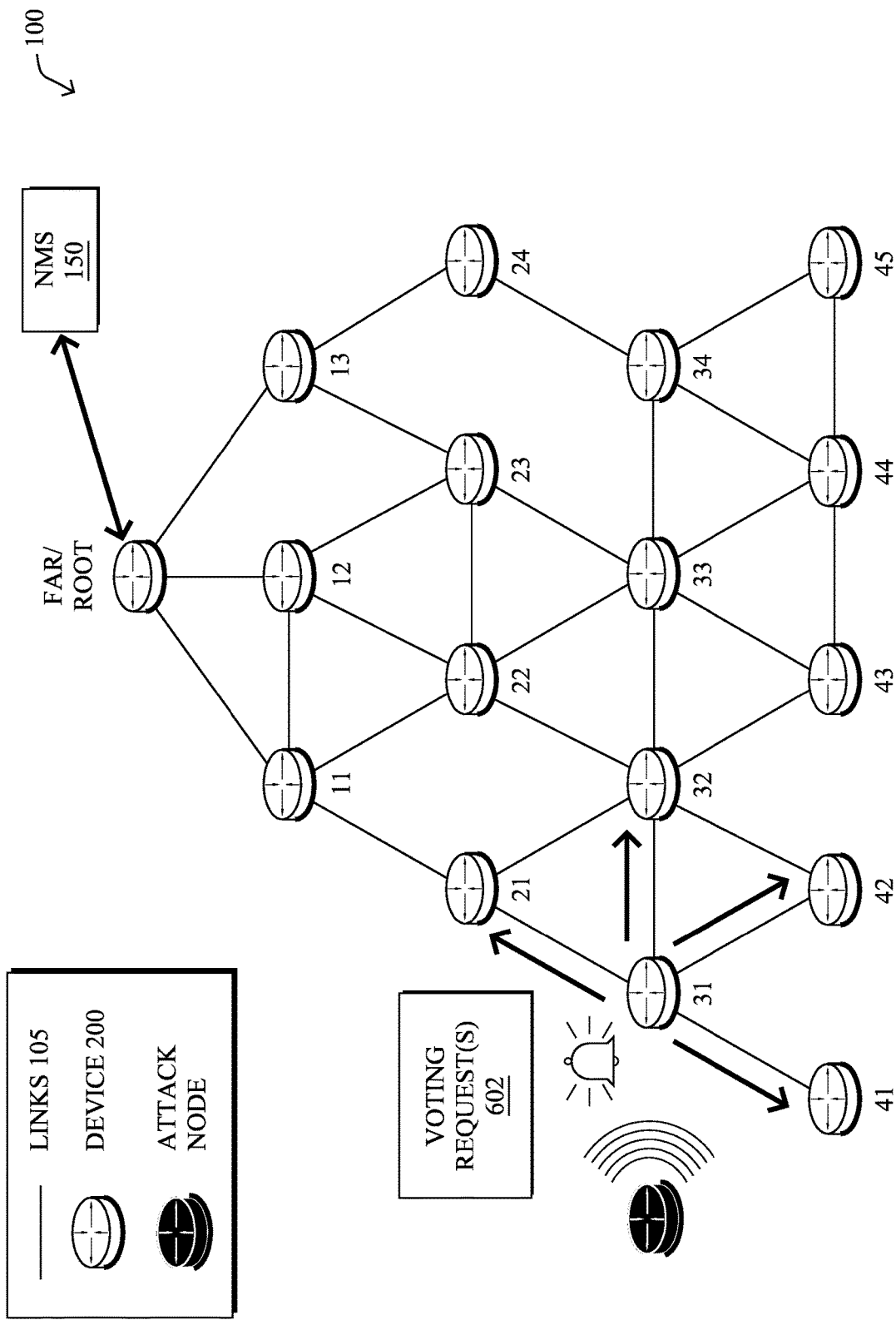
FIGS. 6A-6E illustrate an example voting mechanism for attack detection.
Figure 6B:
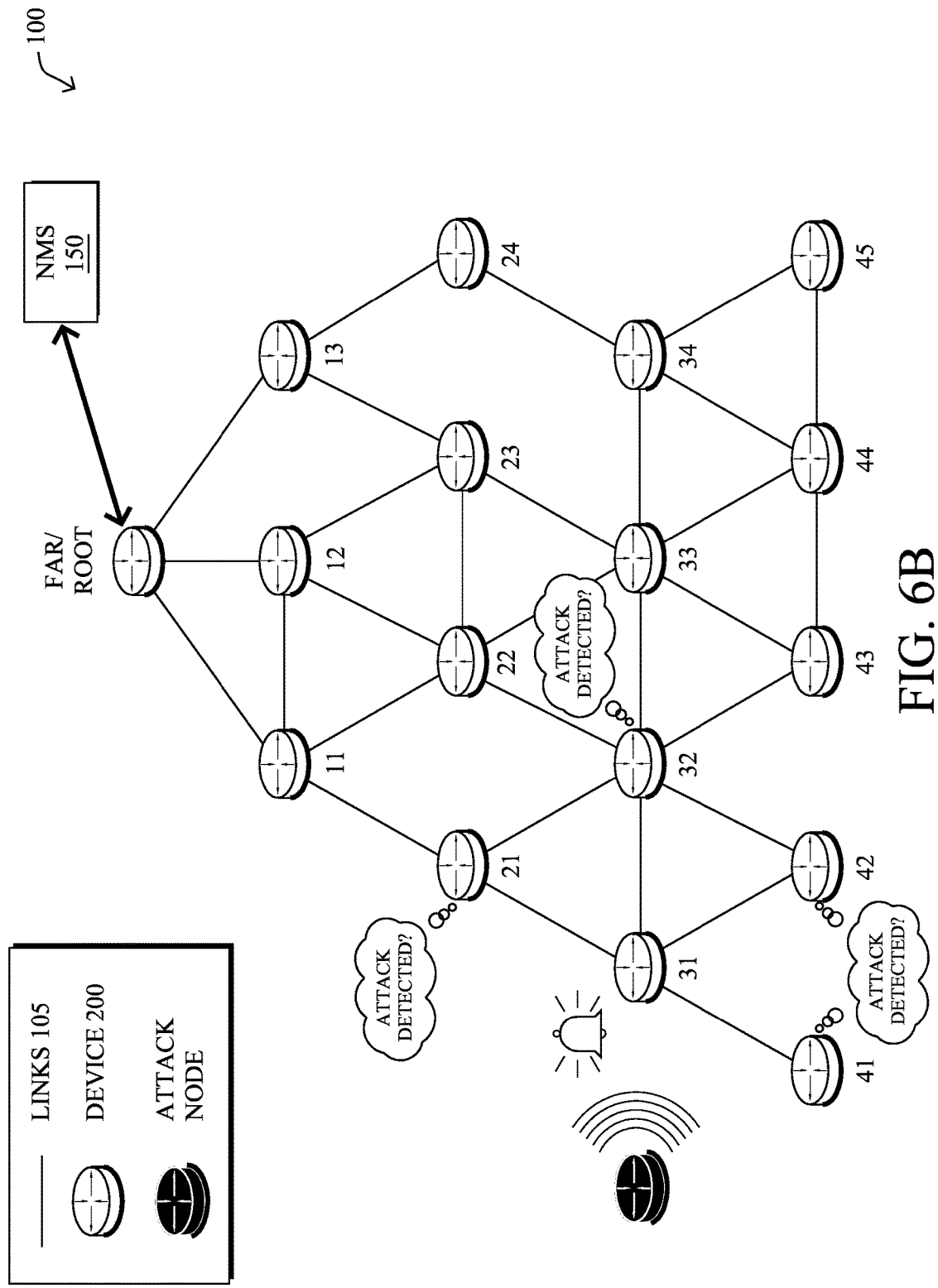
Figure 6C:
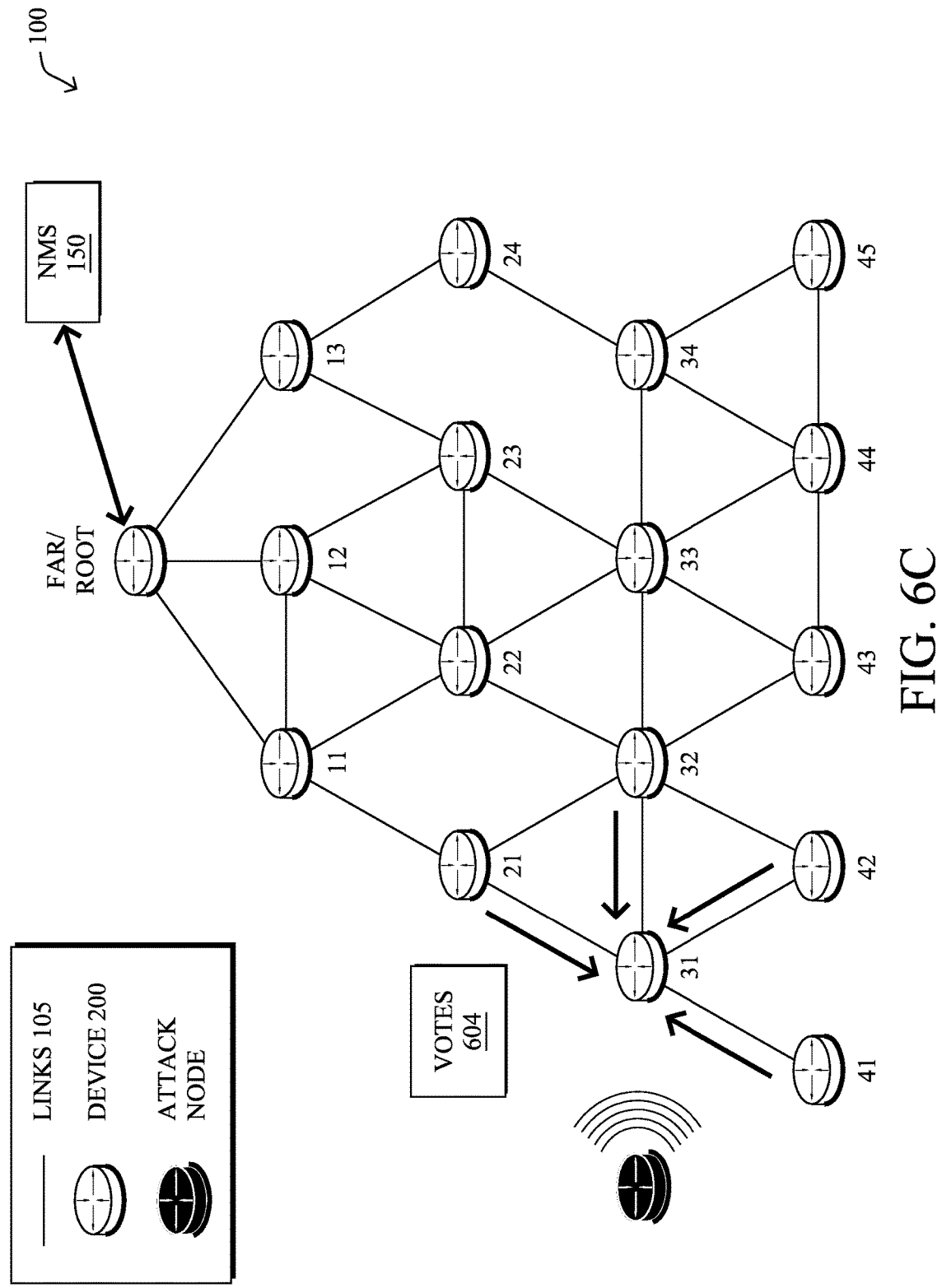
Figure 6D:
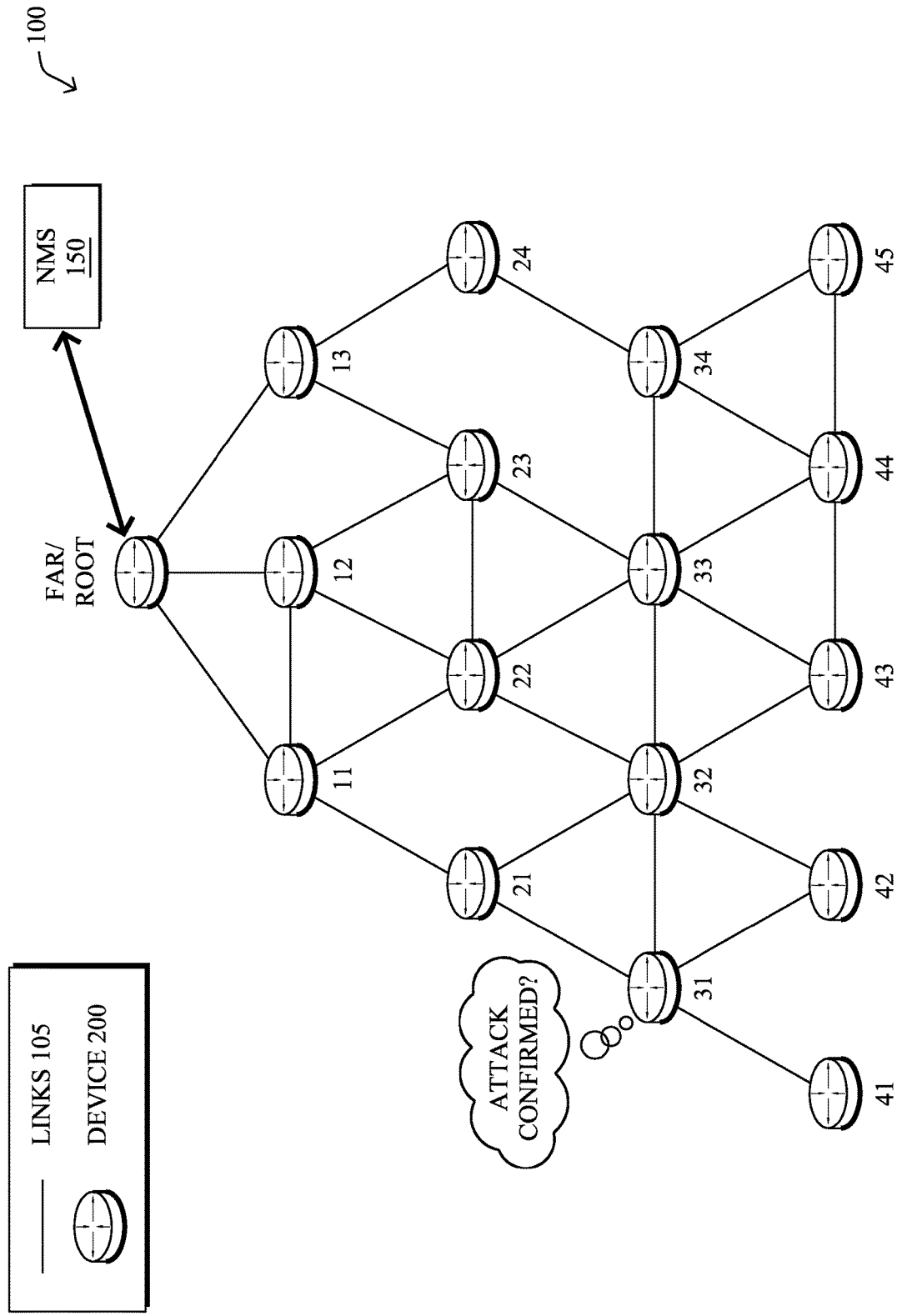
Figure 6E:
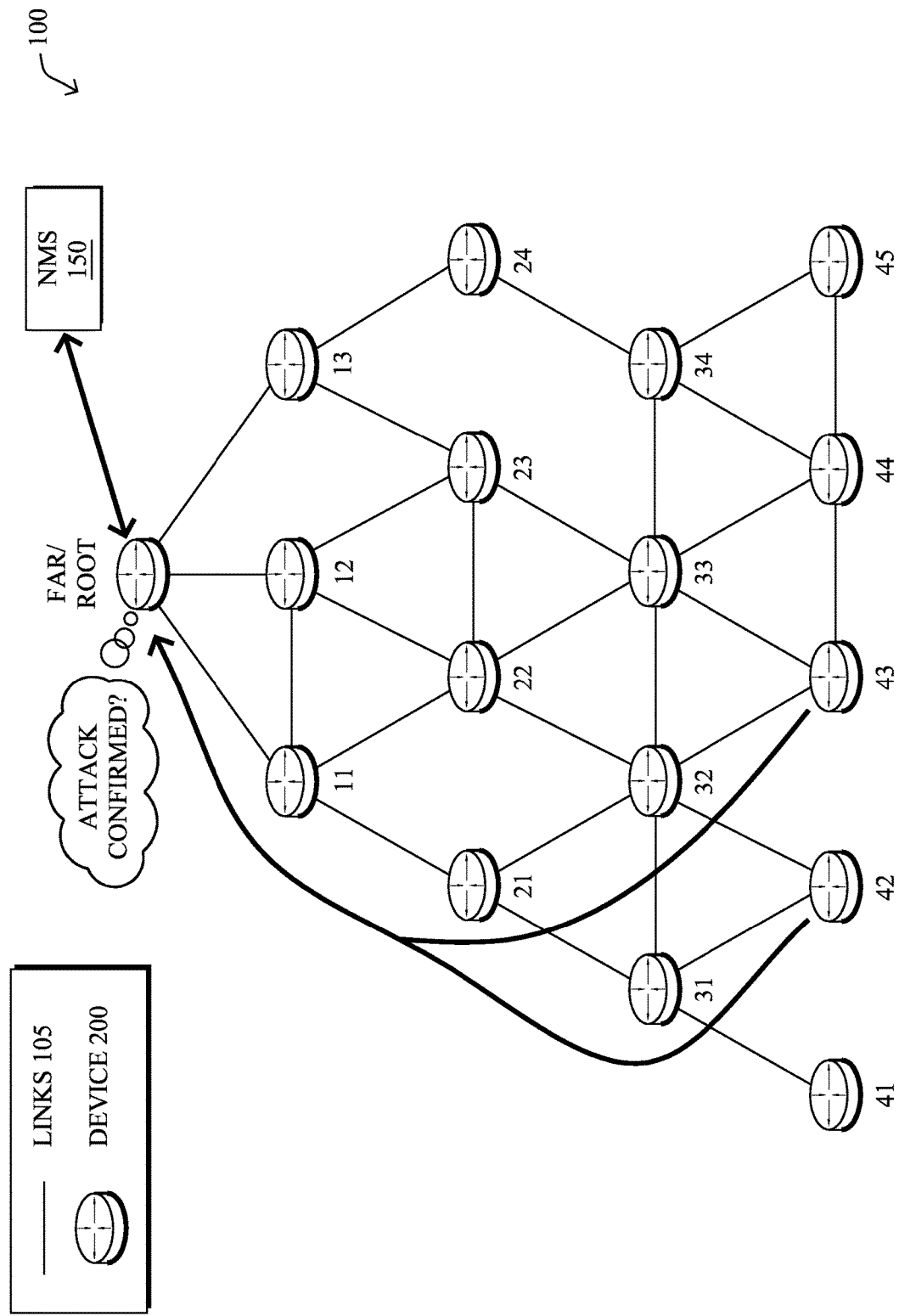

An example voting mechanism for attack detection classifiers is shown in FIGS. 6A-6E. In FIG. 6A, a node 31 hosting a machine learning classifier determines that an attack may be present in the network and sends out voting requests 602 to other classifiers for validation. In some cases, the observations from node 31 may be included in voting requests 602 (e.g., the other voters may analyze the potential attack from the perspective of node 31). In other cases, the observations of the other nodes may be used as part of the voting process (e.g., the other classifiers may independently confirm or deny the presence of an attack). In response to voting requests 602, the other classifiers may determine whether or not an attack is present and return votes 604 to the initiating device, as shown in FIGS. 6B-6C. As shown in FIG. 6D, the vote initiator may then tally the votes, to determine whether or not the attack was confirmed. In some cases, a supervisory device such as a FAR may further validate the detection of an attack by analyzing the observations of the nodes in the region of attack or by collecting and tallying the votes (e.g., as part of a centralized voting approach). It should be appreciated that while FIGS. 6A-6E illustrate one potential voting mechanism, other voting mechanisms may also be used in conjunction with the teachings herein.

In general, a voting mechanism for attack detection uses a set of N-number of classifiers as voters. The classifiers may be of the same or different natures, such as using potentially different feature sets but still outputting the same output labels (e.g., classes). Votes among the N-number of classifiers may be conducted in various ways. For example, assume that K-number of the classifiers must classify the feature set(s) as attacks, for the voting consensus to conclude that an attack is detected. If K=N, then the vote must be unanimous. If K>int(N/2)+1, then a majority of the classifiers must vote in favor of an attack. Thus, parameters associated with a voting mechanism may include the number of participating voters (N) and/or the threshold number of voters to reach a conclusion (K) (e.g., to use majority voting, unanimous voting, etc.).

Figure 7:
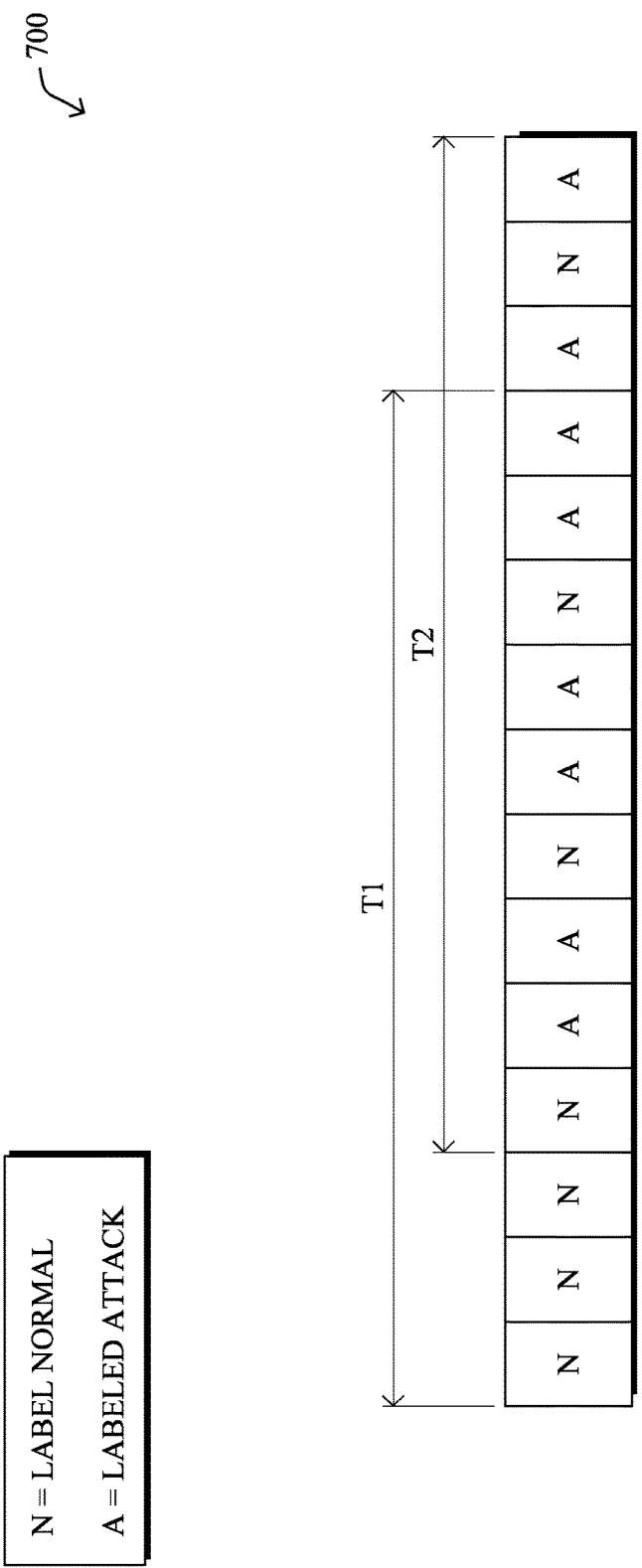
FIG. 7 illustrates an example time series of attack classifications.

Other parameters that may be adjusted in a distributed classifying system relate to the use of temporal filtering. An example time series 700 of attack classifications is shown in FIG. 7. As shown, attack detection process 248 may post-process all labeled samples produced by the classifier (e.g., an ANN, etc.) over the period of time T using a temporal rule. Such a rule may entail, for example, attack detection process 248 outputting the label with a specific value if and only if, over the course of T, P-number of samples were labeled as indicative of attacks out of the Q-number of samples evaluated from T. In other words, P may be a minimum consensus that must be reached within T, for an attack to be detected.

As shown in FIG. 7, for example, let Q=12 samples per time period T. Now, assume that P=8. In such a case, the samples evaluated in time period T1 may be treated as a potential attack, since only six samples were labeled as indicative of an attack. However, in the time period T2 shown, this number increases to eight samples, meeting the threshold of P. In this case, a notification may be generated. In various cases, the values of P, Q, and T can be adjusted, to tune the sensitivity of the local classifier. Notably, if P is significantly less than Q, the recall of the classifier increases at the cost of also increasing the number of false positives. In addition, as P increases, the recall degrades/decreases, the false positive rate improves/decreases, and the precision of the classifier improves/increases. Accordingly, a tradeoff exists among these parameters.

In various embodiments, the above parameters K, N, T, P, and/or Q may be adjusted dynamically as part of a control loop, to continually satisfy the attack detection SLA(s) for the attack detection system. Such adjustments may be facilitated by parameter adjustment process 247 in conjunction with attack detection process 248. In particular, an NMS or other supervisory device of the network may act as a DoS SLA manager (DSM). Similarly, a network controller or other device may act as an adjusting parameter manager (APM). Deployed throughout the network may also be any number of remote classifiers RCi. Notably, a particular switch or router in the network may host one or more classifiers.

A custom IP message referred to herein as a DoS attack SLA message (DS( )) may be sent by the DSM to the APM and specifies the required SLA for the DoS detection system. Such a message may include, for example, the set of one or more performance metrics that characterize the required DoS detection performance required by a network administrator. The DS( ) message may also be extended with additional information. In one embodiment, such a message specifies the required recall and false positive rate. However, other metrics such as a precision may also be included. In another embodiment, these metrics may be specified on a per-attack basis. In particular, a user may have different performance expectations for different types of attack. For example, if the type of attack would be very detrimental/destructive to the network, the user may require a high recall at the expense of a higher false positive rate, whereas the opposite may be requested for a DoS attack that would have less of an impact on the network.

Figure 8A:
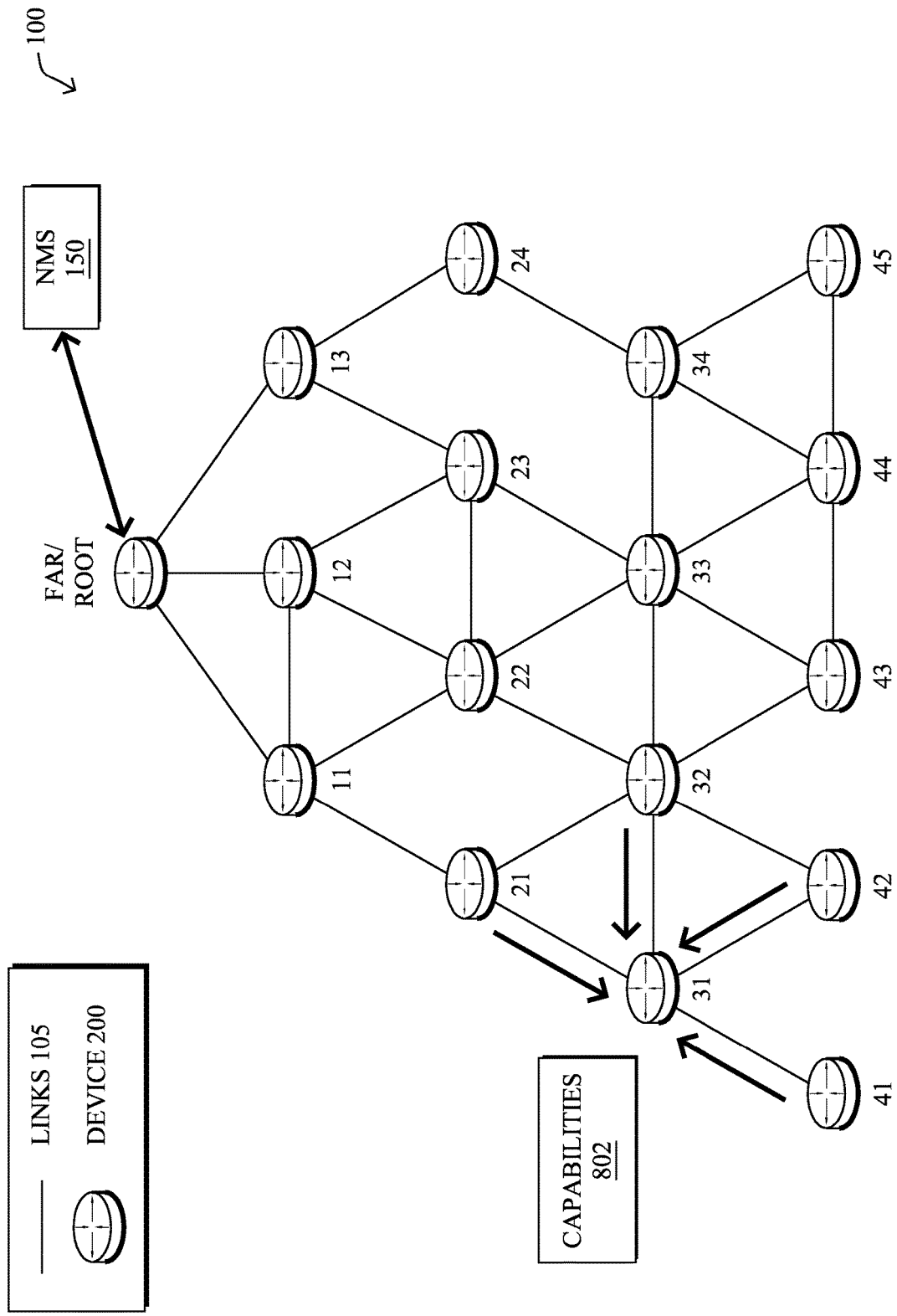
FIGS. 8A-8E illustrate an example of a voting mechanism for attack detection being determined.

In various embodiments, a classifier RCi may advertise its capabilities. For example, as shown in FIG. 8A, capabilities 802 may be advertised by the classifiers hosted by the various network devices. Capabilities 802 may be sent, for example, using an OSPF Opaque LSA of type 10 or 11, or a custom ISIS TLV, in an enterprise network. Such a message may include, but is not limited to, the following parameters: 1.) the type of attack the classifier can detect, 2.) the nature of the classifier (e.g., ANN, etc.), 3.) the ability to support temporal voting, and/or 4.) potentially the current values of T, P, and Q if temporal voting is used.

In further aspects, the APM may be in charge of translating the DoS SLA requirements specified by a network administrator into parameter settings for the attack detection mechanism of the network. In addition, the APM may continuously adjust these parameters by interacting with the attack detection classifiers, effectively forming a closed loop system.

Figure 8B:
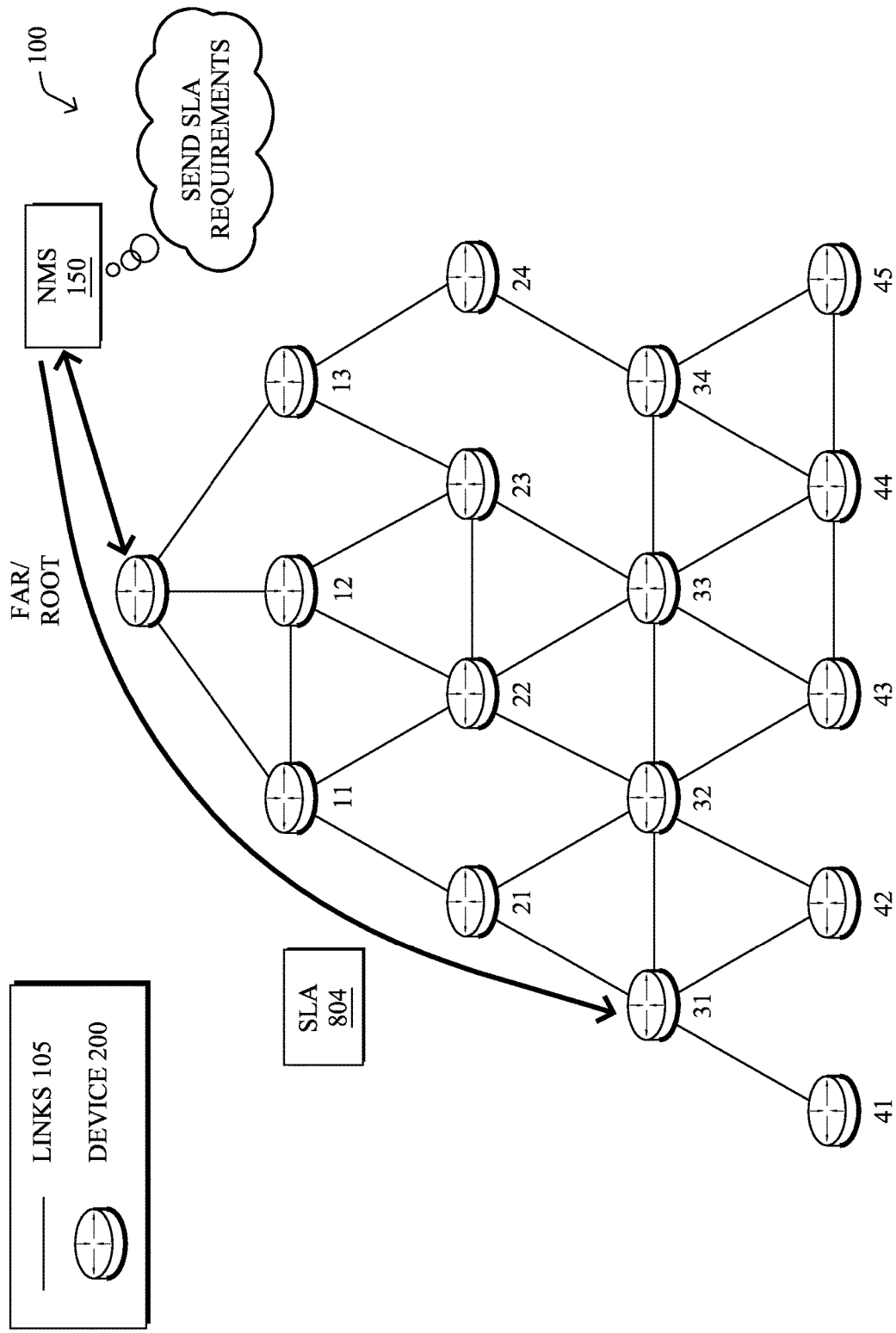

On reception of a DS( ) message, the APM will first identify the set of RCi in charge of detecting DoS attacks or a specific DoS attack of interest, if specified in the DS( ) message thanks to the newly specified routing extensions. For example, as shown in FIG. 8B, SLA requirements 804 may be sent to node 31 as part of a DS( ) message. In the example shown, assume that node 31 is acting as the APM for the attack detection mechanism in network 100. As would be appreciated, this configuration is exemplary only and that any device in a network may act as the APM. For example, in an enterprise network, the network controller may fulfill the role of the APM, in another embodiment.

Figure 8C:
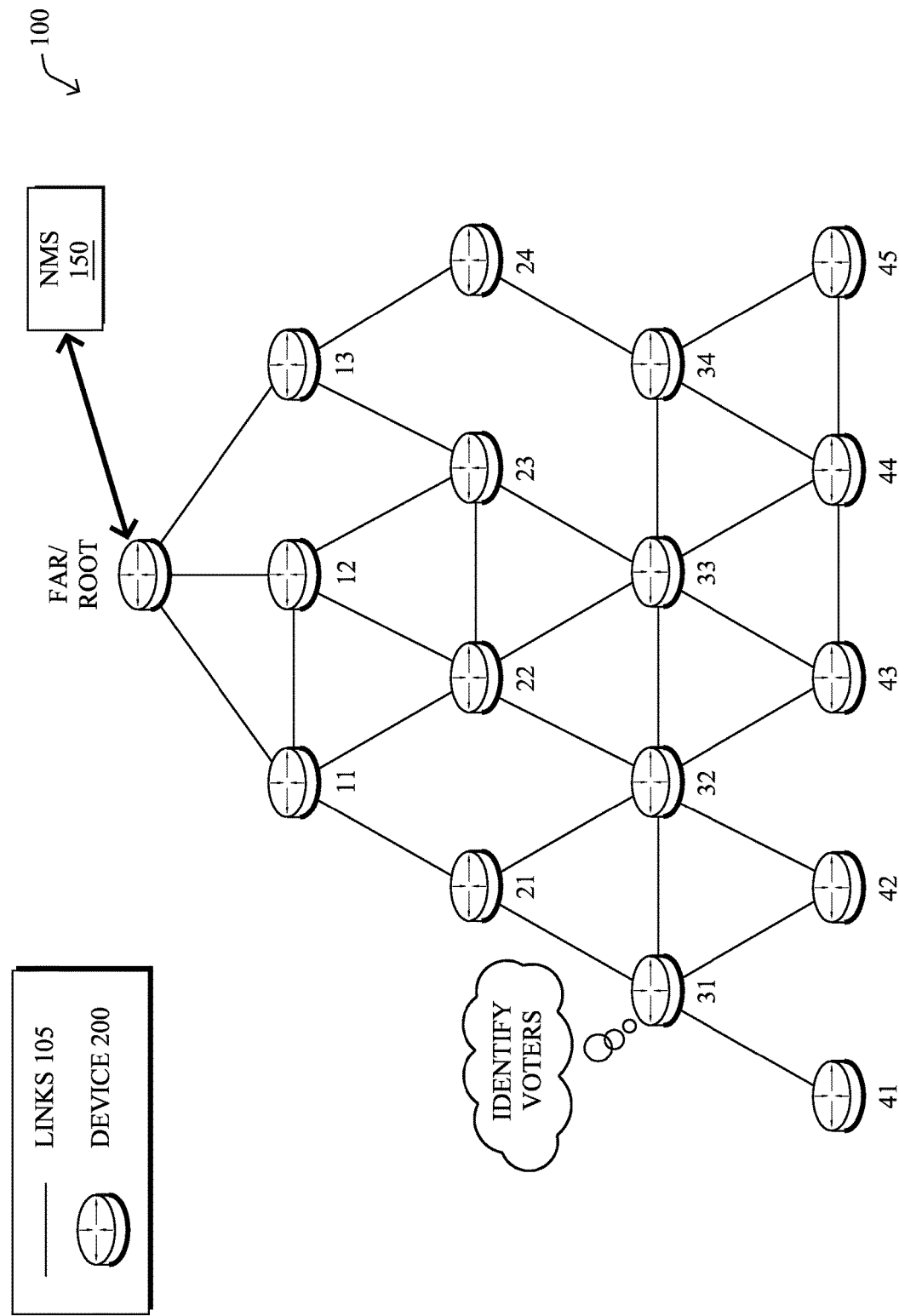
Figure 8D:
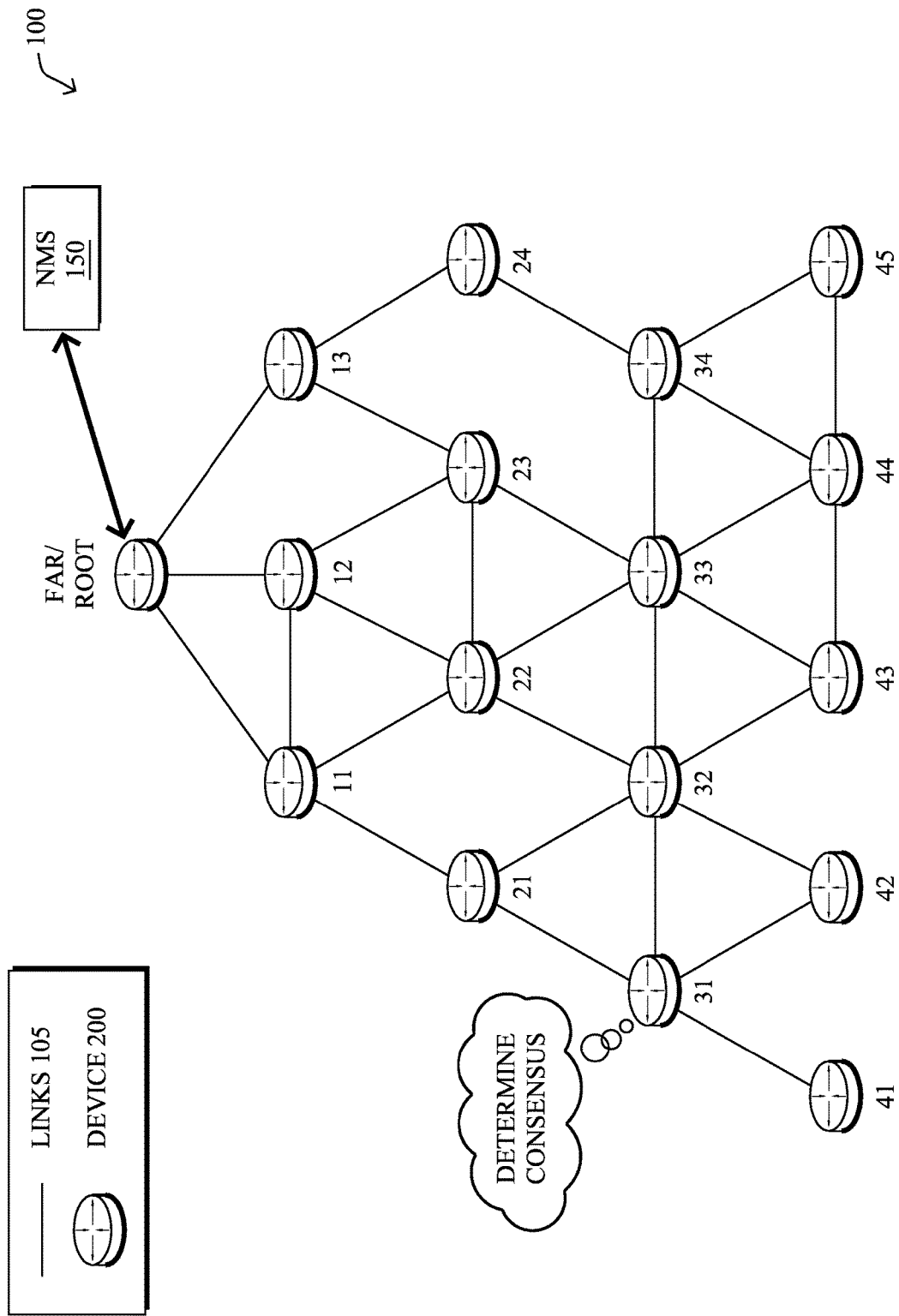

In response to receiving a DS( ) message, the APM may select a set of voters (N) and a consensus threshold (K) for the voters, as shown in FIGS. 8C-8D. K is used to determine how many votes are required among the set of N-number of voters, to conclude that an attack is present. In one embodiment, the voting may take place on the APM itself. In another embodiment, the APM may select a remote note to tally votes. For example, a remote node that is closer to the set of voters (e.g., to reduce traffic overhead) may be selected in some cases to collect the votes, thus specifying that the nodes should only report an attack if at least K out of the N voters detected the attack before replying back to the APM. In this implementation, the APM would indicate to the node collecting the votes the values for K, N as well as the identities of the N voting nodes. In some cases, weighting factors may also be determined and used such that a vote cast by a particular classifier may be weighted. For example, a particular vote may be weighted based on the known performance of the classifier (e.g., a vote from a node that is known to have a high false positive rate may receive a lower weight).

Figure 8E:
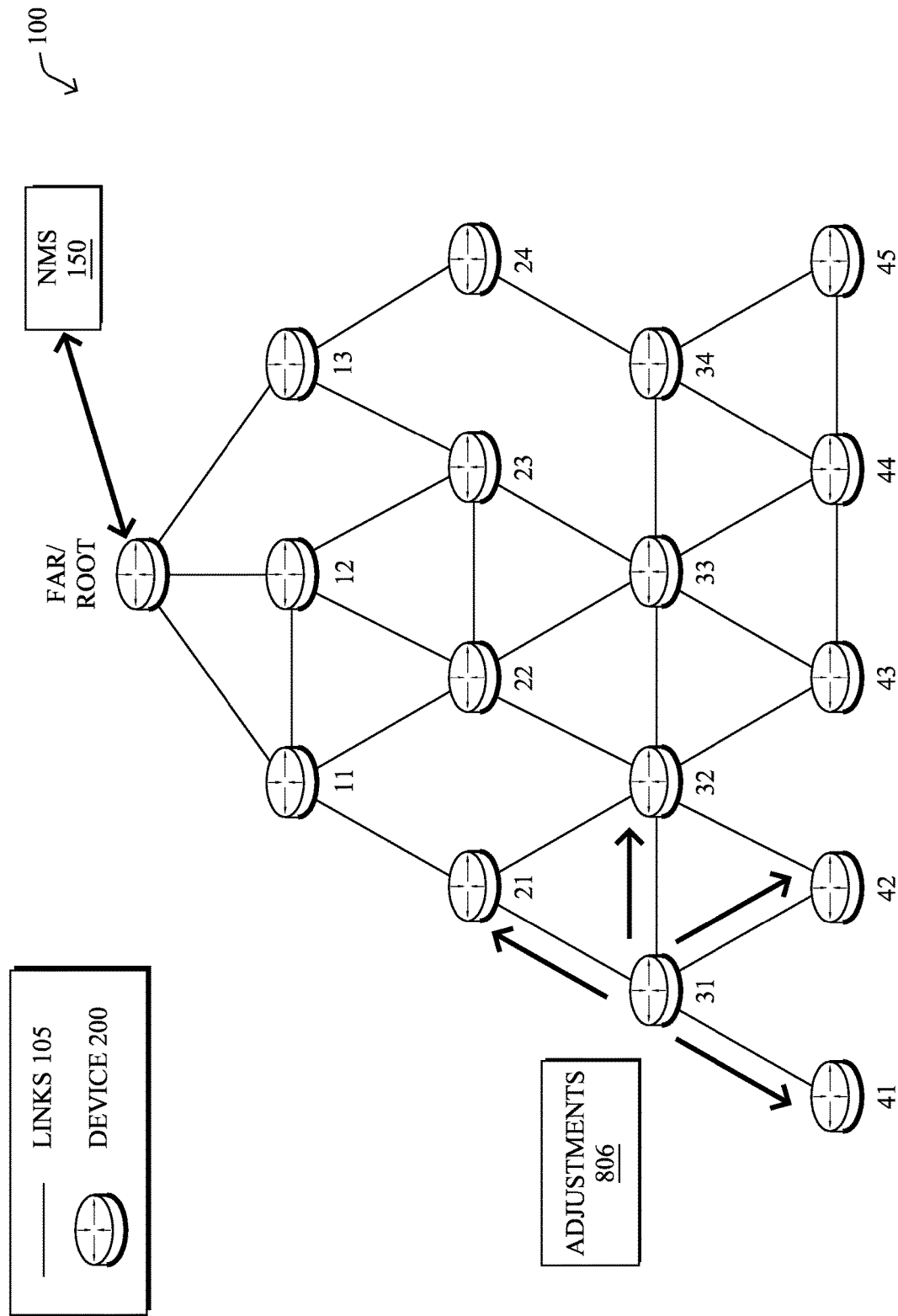

Once the voting mechanism has been determined, the temporal voting parameters T, P, and Q for each classifier may be adjusted dynamically. As discussed above, these parameters may be used to decrease the false positive rate of a classifier by triggering an alarm (or positive vote) if and only if at least P of the Q-number of samples evaluated in time period T are positive. Notably, adjusting these values may affect the resulting performance metrics of the classifiers (e.g., recall, precision, false positive rate, etc.). For example, as shown in FIG. 8E, node 31 may set send parameter adjustments 806 to the participating voters, to set their respective temporal voting parameters in an attempt to satisfy the attack detection SLA(s).

Figure 9A:
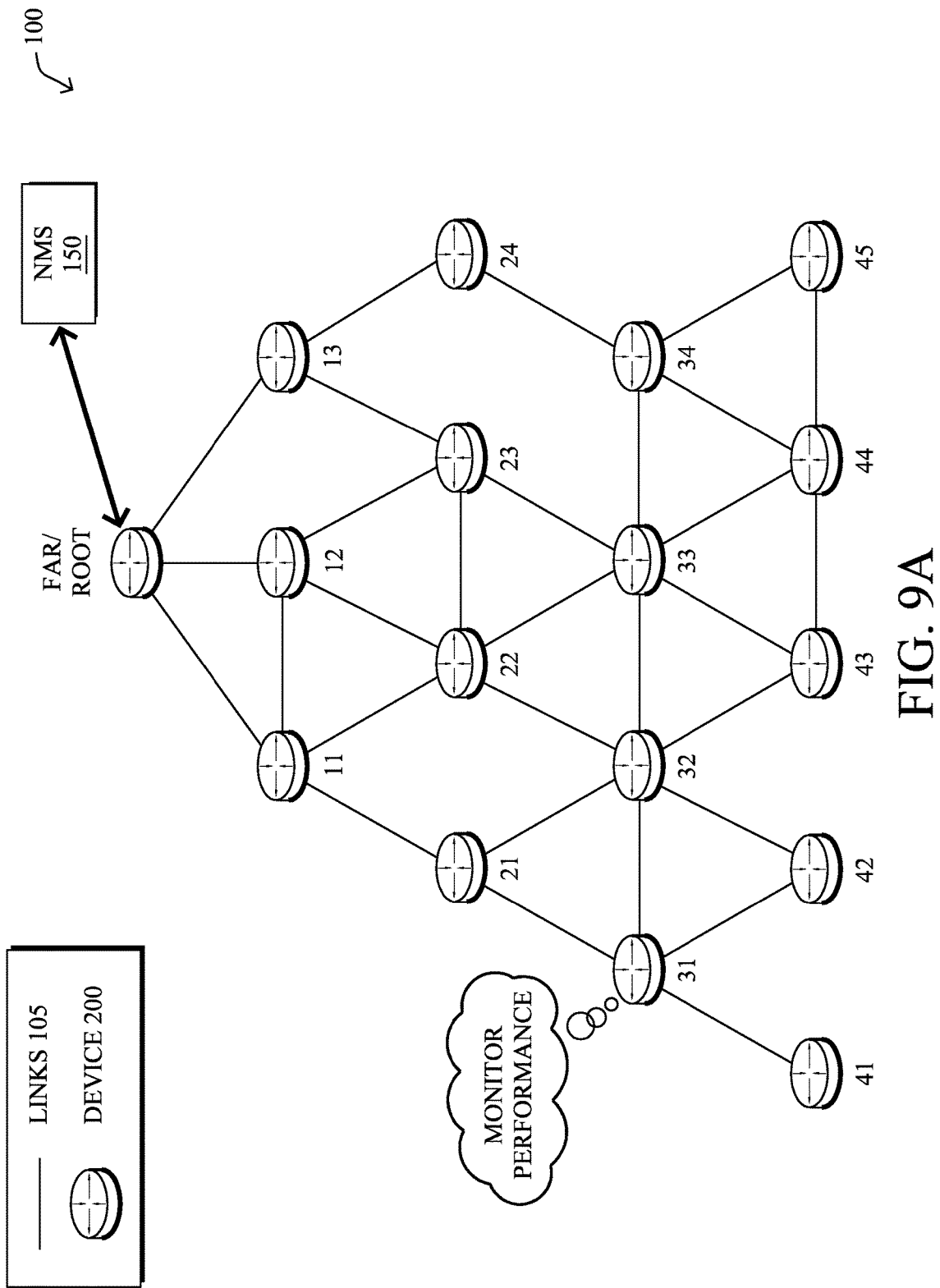
FIGS. 9A-9D illustrate an example of an attack detection voting mechanism being adjusted.
Figure 9B:
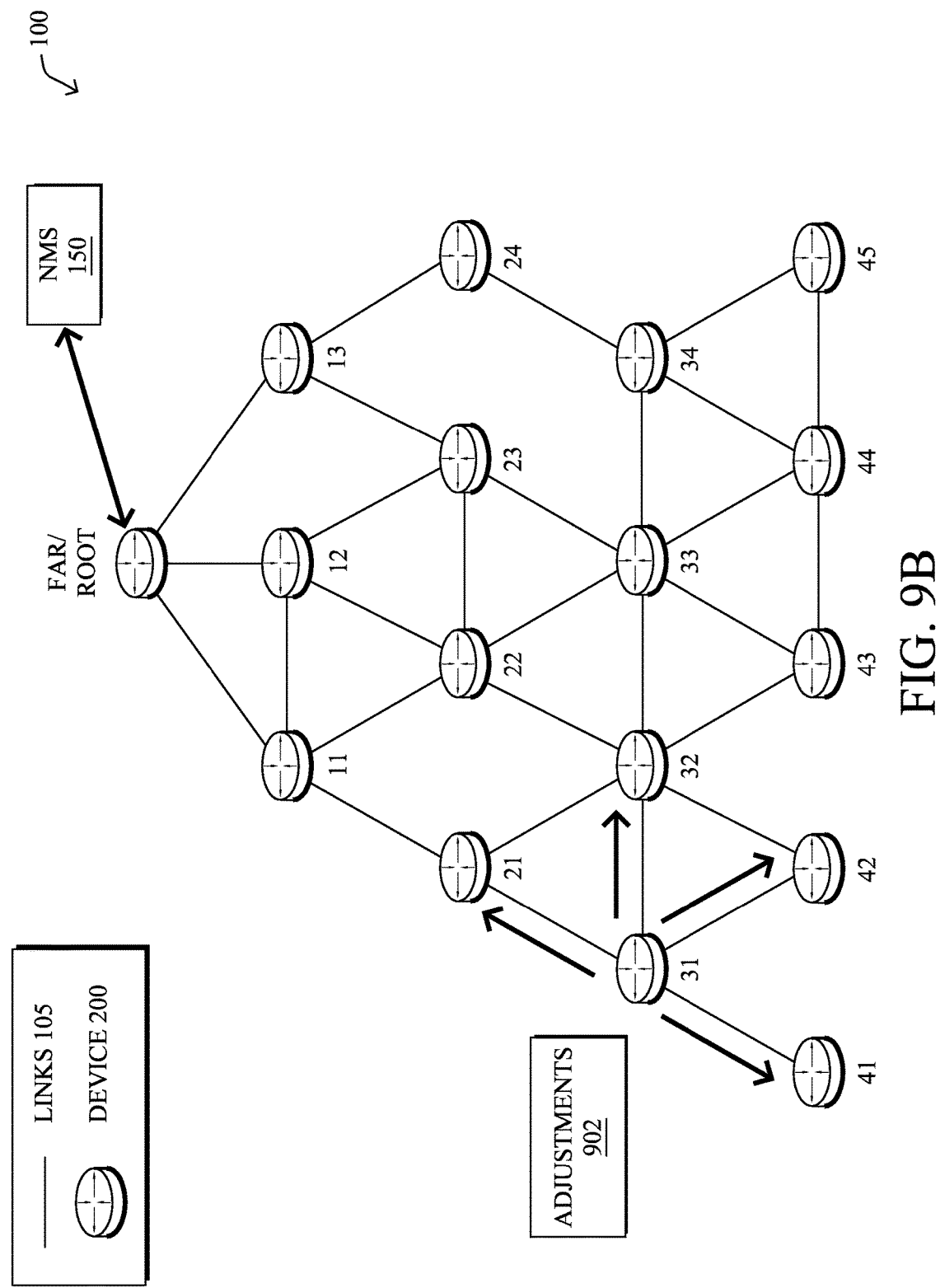

Once the voting mechanism and temporal voting parameters have been set, the APM may monitor the resulting performance metrics of the attack detection system (e.g., recall, precision, false positives, etc.) according to the strategy implemented by the APM to satisfy the attack detection SLA(s). For example, as shown in FIG. 9A, node 31 may monitor the performance of the attack detection system, to ensure that the parameters K, N, T, P, and/or Q set by node 31 result in performance metrics that satisfy the SLA(s). If node 31 detects that the recall, false positive rate, etc. of the attack detection system are not in line with the SLA(s) specified by the user, it may re-adjust one or more of the parameters K, N, T, P, and/or Q, as shown in FIG. 9B. According to various embodiments, this may be accomplished using a control loop that smoothly adjusts the corresponding parameters.

By way of illustration only, assume that the number of false positives is too high for a specific DoS attack and does not satisfy the user-specified SLA. In such a case, the APM may start increasing the number of voters required to detect an attack (e.g., by increasing the value of K, up to a unanimous voting situation whereby K=N). After doing so, the APM may start a timer to monitor the resulting false positive rate.

For the sake of illustration, if the number of False positive is too high for a specific DoS attack and does not meet the user requirement, the APM may start increasing the number of voters, thus increasing the value of K, up to unanimous voting where K=N and then start a timer to monitor the rate of false positives. Alternatively the APM may use a mechanism that periodically tests the performance of a classifier, such as by asking the classifier to classify a set of known attack traffic records or by initiating a controlled attack on the classifier. In another embodiment, the APM may start adjusting the temporal filtering and adjust the period of time T, and the values of P and Q (e.g., increasing P).

Figure 9C:
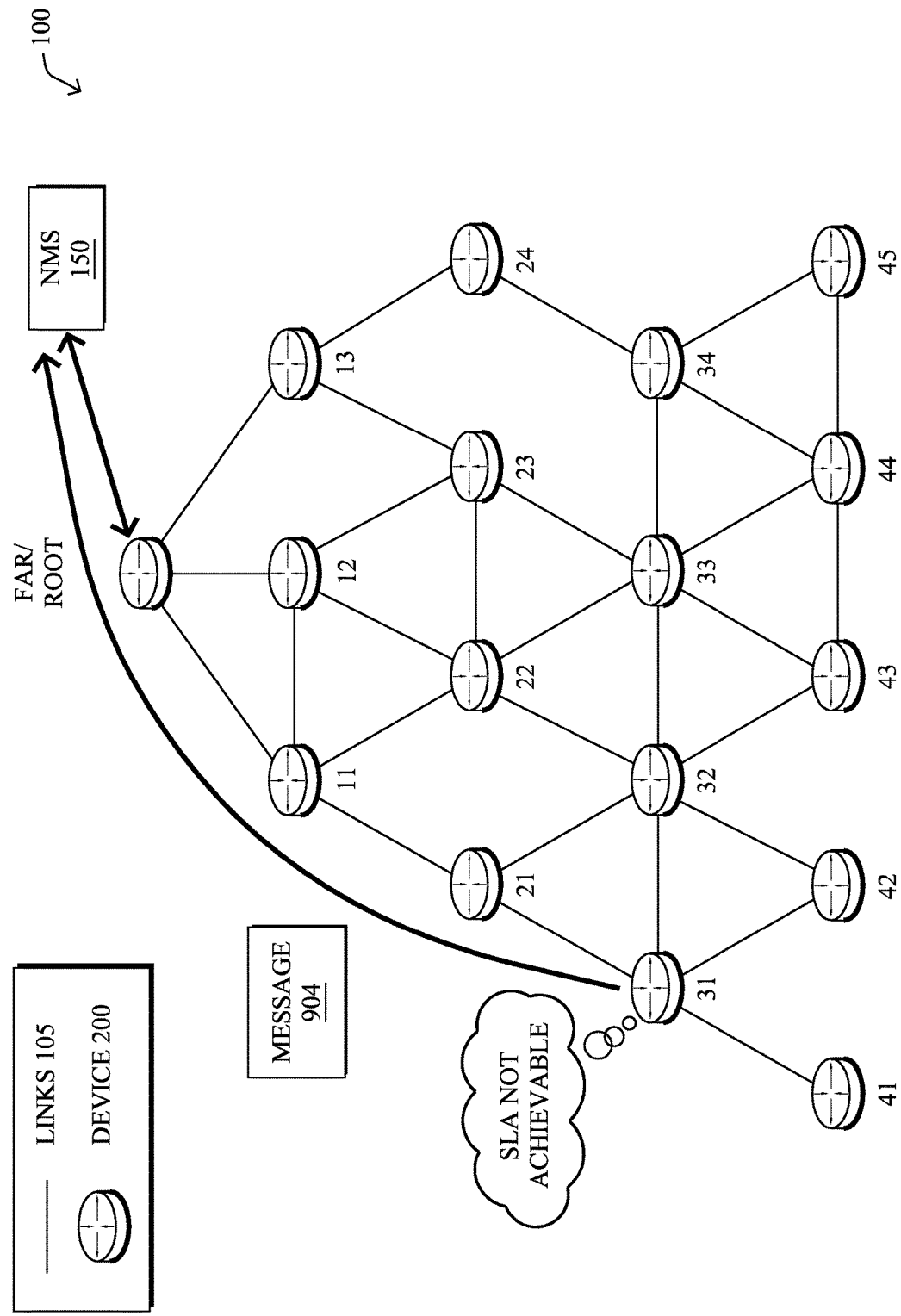

Regardless of which adjustments are made, the APM may smoothly increase or decrease the selected values and then wait to evaluate the effects of these changes, to determine whether the user-specified SLA(s) are now met for the specified attack type. In some cases, a particular attack detection SLA requirement may be unachievable. In this case, if the APM cannot achieve the required SLA within a certain period of time, the APM may send a notification message back to the DSM. For example, as shown in FIG. 9C, node 31 may send a notification message 904 back to NMS 150 that the SLA is unachievable. In some cases, notification message 904 may also indicate the performance metrics that were closest to the SLA that were achieved by the attack detection system.

Once and if the requested SLA has been reached, the APM may periodically check that the current set-up retains the same performance level. For example, changing network conditions may cause a particular classifier's performance to degrade over time. In some cases, the APM may periodically test the performance of the classifier (e.g., using a simulated attack, asking the classifier to classify a known set of attack traffic records, etc.).

Figure 9D:
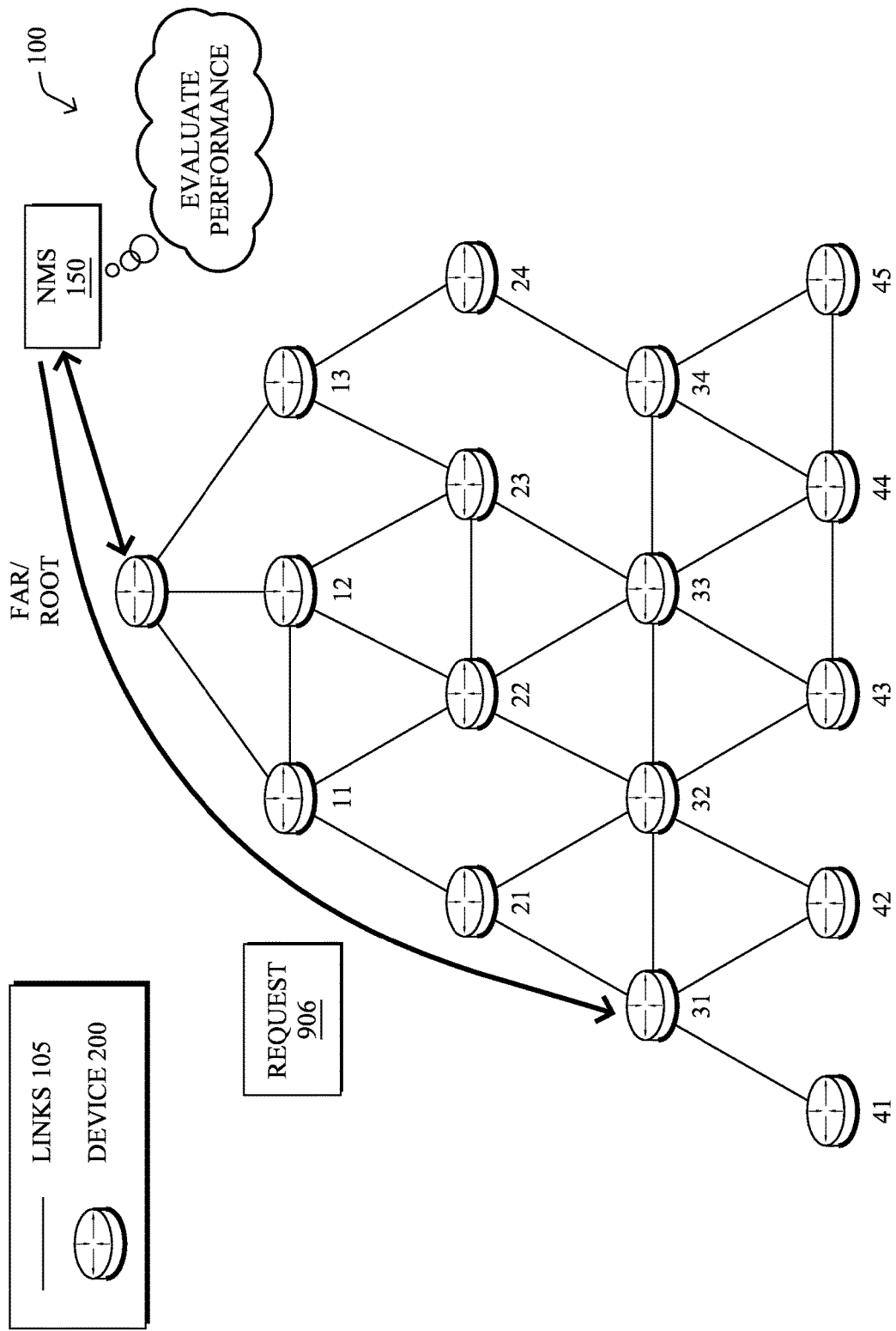

In further embodiments, the DSM may use the controller facilities of the NMS to track the performance benchmarks of the network (e.g., network utilization, application response time etc.). If it falls below a given threshold, thus suggesting that a DoS attack may be in place, the DSM may request that the APM modify the voting configuration. For example, as shown in FIG. 9D, NMS 150 may send a request 906 to node 31, to request that node 31 adjust the voting configuration. In yet another embodiment, the DoS SLA can specify different target performance for different levels of perceived network performance.

Figure 10:
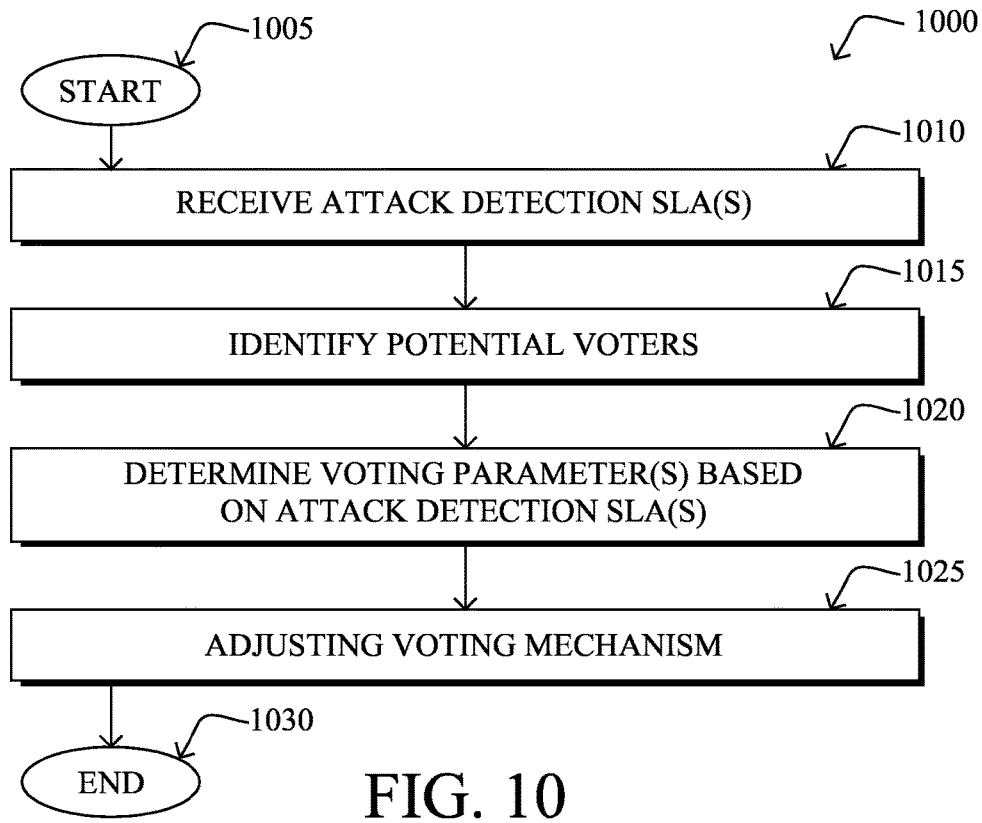
FIG. 10 illustrates an example simplified procedure for adjusting an attack detection voting mechanism.

FIG. 10 illustrates an example simplified procedure for adjusting an attack detection voting mechanism in accordance with one or more embodiments described herein. The procedure 1000 may start at step 1005, and continues to step 1010, where, as described in greater detail above, one or more attack detection SLAs are received by a device in a network. In general, an attack detection SLA corresponds to a set of target performance parameter(s) for a distributed attack detection mechanism present in the network. For example, when machine learning classifiers are deployed within the network to detect a network attack (e.g., a DoS attack), an attack detection SLA may specify a desired level of recall, precision, or false positives exhibited by the attack detection system. Such an SLA may be set by a network administrator or other user. In some cases, the SLA may be specific to a particular type of attack, thereby allowing the attack detection system to exhibit different performances for different attack types.

At step 1015, the device identifies one or more potential voters for the attack detection mechanism, as described in greater detail above. In various embodiments, the attack detection mechanism may include any number of machine learning classifiers used to label network observations as being indicative of an attack or other conditions. In some cases, the various classifiers may employ a voting mechanism whereby each classifier submits its output classification as a vote. Votes may then be tallied, to determine the final classification by the detection mechanism. Information that may be used to identify the voters may include, but is not limited to, capabilities reported by a classifier (e.g., the type of classifier, performance metrics for the classifier, etc.), the network location of a classifier, or other such factors.

At step 1020, the device determines one or more voting parameters based on the received SLA(s), as detailed above. In particular, the performance metrics indicated by an SLA may be translated into a corresponding set of one or more parameters used to control how the attack detection mechanism operates. In some embodiments, the voting parameters may control which classifiers are to participate in a vote and/or how a vote is tallied. For example, the number of voters (N) and the threshold number of voters to reach a consensus (K) maybe adjusted according to the SLA(s) (e.g., increasing the consensus threshold may decrease the number of false positives, etc.). In further embodiments, a classifier may use temporal voting whereby a set of Q-number of samples are collected over a time period T. If P or more of the Q-number of samples are labeled as attacks, the classifier may determine that an attack is present. Notably, adjusting Q, P, and T may also affect the performance metrics of the individual classifier. For example, decreasing P may increase the recall of the classifier, but at the expense of more false positives.

At step 1025, the network device adjusts the voting mechanism used to detect an attack, as described in greater detail above. In various embodiments, the parameter(s) determined in step 1020 may be communicated to one or more of the classifier(s) or to a device that oversees the voting mechanism (e.g., an APM). In some implementations, steps 1015 to steps 1025 may be repeated any number of times as part of a control loop (e.g., the performance of the voting mechanism may be monitored after adjusting its parameters, to determine whether or not further adjustments are needed to satisfy the SLA). Procedure 1000 then ends at step 1030.

Figure 11:
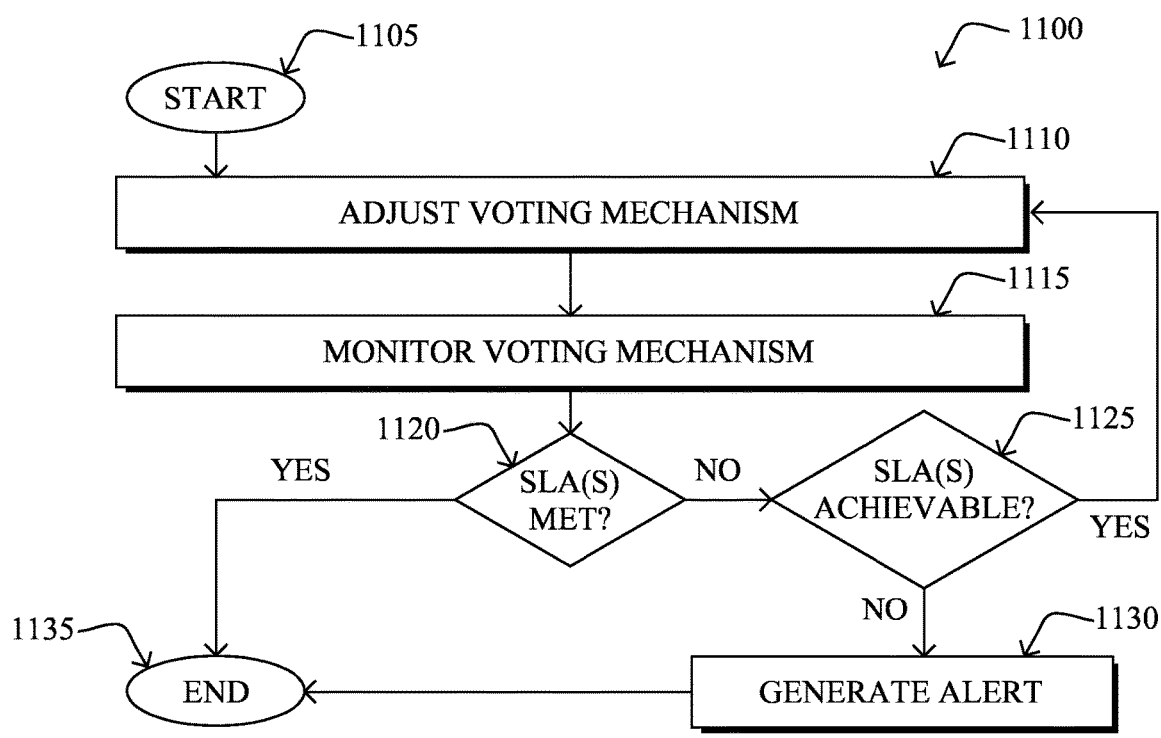
FIG. 11 illustrates an example simplified procedure for using attack detection service level agreements (SLAs) to adjust an attack detection voting mechanism.

FIG. 11 illustrates an example simplified procedure for using attack detection service level agreements (SLAs) to adjust an attack detection voting mechanism in accordance with one or more embodiments described herein. The procedure 1100 may start at step 1105, and continues to step 1110, where, as described in greater detail above, a voting mechanism among machine learning classifiers distributed in a network is adjusted. For example, a network device may adjust the number of voters, the consensus threshold used, and/or any temporal voting parameters, to satisfy one or more attack detection SLAs.

At step 1115, the device monitors the voting mechanism to determine the performance of the voting mechanism after the adjustment, as described in greater detail above. For example, a timer may be started once the parameters of the voting mechanism are adjusted, to track any effects the adjustment has on the performance of the mechanism (e.g., the recall, precision, false positives, etc. of the mechanism).

At step 1120, the device makes a decision as to whether or not any attack detection SLA(s) for the voting mechanism are met, as detailed above. For example, such an SLA may specify a desired amount of recall, false positive rate, etc. for the voting mechanism. If the SLA(s) are not met as a result of the adjustment to the voting mechanism, procedure 1100 may proceed to step 1125. However, if the adjustment causes the voting mechanism to satisfy the SLA(s), procedure 1100 may continue on to step 1135 and end.

At step 1125, the device makes another decision as to whether or not the SLA(s) are achievable via adjustments to the voting mechanism, as described in greater detail above. In some cases, the desired performance specified in an SLA may simply not be achievable. In one embodiment, the decision may be based on the expiration of a timer. For example, if the voting mechanism cannot be adjusted within a certain amount of time to satisfy the SLA(s), the SLA(s) may be deemed unachievable. In another embodiment, the decision may be based on a history of previously used parameter adjustments. For example, if the adjustment control loop begins oscillating between sets of parameters, this may indicate that the SLA(s) are not achievable. If a determination is made that the SLA(s) may still be achievable, procedure 1100 may proceed to step 1110 and repeat any number of times (e.g., as part of a control loop process). However, if a determination is made that the SLA(s) are not achievable, procedure 1100 may proceed to step 1130.

In step 1130, the device may generate an alert that indicates that the SLA(s) are unachievable, as detailed above. For example, the alert may be provided to a user interface device, to alert a network administrator that the SLA(s) are unachievable. In response, the administrator may specify a new attack detection SLA or take other actions. Procedure 1100 then ends at step 1135.

It should be noted that while certain steps within procedures 1000-1100 may be optional as described above, the steps shown in FIGS. 10-11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1000-1100 are described separately, certain steps from each procedure may be incorporated into each other procedure, and the procedures are not meant to be mutually exclusive.

The techniques described herein, therefore, allow attack detection SLAs to be used in a network, thereby allowing a user to control the performance (e.g., recall, false positives, etc.) of an attack detection mechanism. This may dramatically improve the level of flexibility of a deployed attack detection mechanism, such as a set of machine learning classifiers that participate in attack detection votes.

While there have been shown and described illustrative embodiments that provide for dynamic enabling of routing devices in a shared-media communication network, it is to be understood that various other adaptations and modifications may be made within the spirit and scope of the embodiments herein. For example, the techniques herein may be adapted for use within an enterprise network (e.g., MPLS networks, etc.). Additionally, the protocols discussed herein are exemplary only and other protocols may be used within the scope of the teachings herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a device in a network, information regarding one or more attack detection service level agreements for a voting mechanism between attack detection classifiers and used to detect a network attack, wherein the one or more attack detection service level agreements comprise at least one of: a recall threshold for the voting mechanism, a precision threshold for the voting mechanism, or a false positive rate for the voting mechanism;
   identifying, by the device, a set of attack detection classifiers executed by one or more nodes in the network as potential voters in the voting mechanism used to detect a network attack;
   determining, by the device, one or more parameters for the voting mechanism based on the information regarding the one or more attack detection service level agreements;
   adjusting, by the device, the voting mechanism used by the potential voters based on the one or more parameters for the voting mechanism; and
   determining, by the device, whether the one or more attack detection service level agreements have been met by the adjusted voting mechanism.

2. The method as in claim 1, wherein the one or more parameters for the voting mechanism comprise the set of potential voters, and wherein adjusting the voting mechanism comprises:
   instructing one or more of the potential voters to participate in the voting mechanism as actual voters.

3. The method as in claim 2, wherein the one or more parameters for the voting mechanism comprises a consensus threshold for the actual voters, wherein a network attack is detected by the voting mechanism if a number of attack votes from the actual voters meets or exceeds the consensus threshold.

4. The method as in claim 1, wherein the one or more parameters for the voting mechanism comprises a sampling period for a particular voter, wherein a vote generated by the particular voter is based on classification of network characteristics sampled by the particular voter during the sampling period.

5. The method as in claim 4, wherein the one or more parameters for the voting mechanism comprises a number of samples of the network characteristics to be obtained by the particular voter during the sampling period.

6. The method as in claim 1, wherein the one or more parameters for the voting mechanism comprises an attack threshold, wherein the particular voter votes that an attack is present when a number of samples from the sampling period that are labeled by the voter as indicative of an attack meets or exceeds the attack threshold.

7. The method as in claim 1, further comprising:
   in response to a determination that a service level agreement has not been met,
   determining one or more new parameters for the voting mechanism; and
   re-adjusting the voting mechanism using the one or more new parameters.

8. The method as in claim 1, further comprising:
   providing an alert to a network management system in response to a determination that the one or more attack detection service level agreements cannot be met.

9. An apparatus, comprising:
   one or more network interfaces to communicate with a network;
   a processor coupled to the network interfaces and configured to execute one or more processes; and
   a memory configured to store a process executable by the processor, the process when executed operable to:
      receive information regarding one or more attack detection service level agreements for a voting mechanism between attack detection classifiers and used to detect a network attack, wherein the one or more attack detection service level agreements comprise at least one of: a recall threshold for the voting mechanism, a precision threshold for the voting mechanism, or a false positive rate for the voting mechanism;
      identify a set of attack detection classifiers executed by one or more nodes in the network as potential voters in the voting mechanism used to detect a network attack;
      determine one or more parameters for the voting mechanism based on the information regarding the one or more attack detection service level agreements;
      adjust the voting mechanism used by the potential voters based on the one or more parameters for the voting mechanism; and
      determine whether the one or more attack detection service level agreements have been met by the adjusted voting mechanism.

10. The apparatus as in claim 9, wherein the one or more parameters for the voting mechanism comprise the set of potential voters, and wherein adjusting the voting mechanism comprises:
    instructing one or more of the potential voters to participate in the voting mechanism as actual voters.

11. The apparatus as in claim 10, wherein the one or more parameters for the voting mechanism comprises a consensus threshold for the actual voters, wherein a network attack is detected by the voting mechanism if a number of attack votes from the actual voters meets or exceeds the consensus threshold.

12. The apparatus as in claim 9, wherein the one or more parameters for the voting mechanism comprises a sampling period for a particular voter, wherein a vote generated by the particular voter is based on classification of network characteristics sampled by the particular voter during the sampling period.

13. The apparatus as in claim 12, wherein the one or more parameters for the voting mechanism comprises a number of samples of the network characteristics to be obtained by the particular voter during the sampling period.

14. The apparatus as in claim 9, wherein the one or more parameters for the voting mechanism comprises an attack threshold, wherein the particular voter votes that an attack is present when a number of samples from the sampling period that are labeled by the voter as indicative of an attack meets or exceeds the attack threshold.

15. The apparatus as in claim 9, wherein the process when executed is further operable to:
in response to a determination that a service level agreement has not been met,
determine one or more new parameters for the voting mechanism; and
re-adjust the voting mechanism using the one or more new parameters.

16. The apparatus as in claim 9, wherein the process when executed is further operable to:
provide an alert to a network management system in response to a determination that the one or more attack detection service level agreements cannot be met.

17. A tangible, non-transitory, computer-readable media having software encoded thereon, the software when executed by a processor operable to:
receive information regarding one or more attack detection service level agreements for a voting mechanism between attack detection classifiers and used to detect a network attack, wherein the one or more attack detection service level agreements comprise at least one of: a recall threshold for the voting mechanism, a precision threshold for the voting mechanism, or a false positive rate for the voting mechanism;
identify a set of attack detection classifiers executed by one or more nodes in the network as potential voters in the voting mechanism used to detect a network attack;
determine one or more parameters for the voting mechanism based on the information regarding the one or more attack detection service level agreements;
adjust the voting mechanism used by the potential voters based on the one or more parameters for the voting mechanism; and
determine whether the one or more attack detection service level agreements have been met by the adjusted voting mechanism.

18. The computer-readable media as in claim 17, wherein the software when executed by the processor is further operable to:
in response to a determination that a service level agreement has not been met,
determine one or more new parameters for the voting mechanism; and
re-adjust the voting mechanism using the one or more new parameters.

19. The computer-readable media as in claim 17, wherein the software when executed by the processor is further operable to:
provide an alert to a network management system in response to a determination that the one or more attack detection service level agreements cannot be met.

* * * * *